(12) United States Patent
Qin et al.

(10) Patent No.: US 11,308,723 B2
(45) Date of Patent: Apr. 19, 2022

(54) DRIVING STATE DETECTION METHOD AND APPARATUS, DRIVER MONITORING SYSTEM AND VEHICLE

(71) Applicant: SHANGHAI SENSETIME INTELLIGENT TECHNOLOGY CO., LTD., Shanghai (CN)

(72) Inventors: Renbo Qin, Shanghai (CN); Daqian Yang, Shanghai (CN)

(73) Assignee: SHANGHAI SENSETIME INTELLIGENT TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/031,017

(22) Filed: Sep. 24, 2020

(65) Prior Publication Data
US 2021/0004618 A1 Jan. 7, 2021

Related U.S. Application Data

(63) Continuation of application No. PCT/CN2019/111931, filed on Oct. 18, 2019.

(30) Foreign Application Priority Data

Oct. 19, 2018 (CN) .......................... 201811224308.9

(51) Int. Cl.
*G06K 9/00* (2006.01)
*G06T 7/70* (2017.01)
(Continued)

(52) U.S. Cl.
CPC .......... *G06V 20/597* (2022.01); *B60W 40/08* (2013.01); *B60W 50/14* (2013.01); *B60W 60/0051* (2020.02); *G06N 3/0454* (2013.01); *G06T 7/70* (2017.01); *G06V 40/171* (2022.01); *G06V 40/19* (2022.01); *B60W 2040/0818* (2013.01);
(Continued)

(58) Field of Classification Search
None
See application file for complete search history.

(56) References Cited

U.S. PATENT DOCUMENTS

2016/0001781 A1 1/2016 Fung et al.
2016/0272217 A1* 9/2016 Kim .................. G06K 9/00255
2018/0240319 A1 8/2018 Wulf

FOREIGN PATENT DOCUMENTS

CN 102013013 A 4/2011
CN 104688251 A 6/2015
(Continued)

OTHER PUBLICATIONS

International Search Report for Application No. PCT/CN2019/111931, dated Jan. 19, 2020, 5 pages.
(Continued)

*Primary Examiner* — Thomas S McCormack

(57) ABSTRACT

Embodiments of the present disclosure provide a driving state detection method and apparatus, a driver monitoring system, and a vehicle. The driving state detection method includes: performing head pose detection and eye state detection on a driver image to obtain head pose information
(Continued)

and eye state information; and determining detection results of fatigue state and distraction state of the driver according to the head pose information and the eye state information.

20 Claims, 3 Drawing Sheets

(51) Int. Cl.
*B60W 60/00* (2020.01)
*B60W 40/08* (2012.01)
*B60W 50/14* (2020.01)
*G06N 3/04* (2006.01)
*G06V 20/59* (2022.01)
*G06V 40/19* (2022.01)
*G06V 40/16* (2022.01)

(52) U.S. Cl.
CPC . *B60W 2050/143* (2013.01); *B60W 2540/225* (2020.02); *B60W 2540/229* (2020.02); *G06T 2207/30201* (2013.01); *G06T 2210/12* (2013.01)

(56) References Cited

FOREIGN PATENT DOCUMENTS

| | | |
|---|---|---|
| CN | 105764735 A | 7/2016 |
| CN | 107405121 A | 11/2017 |
| CN | 108229284 A | 6/2018 |
| CN | 108446600 A | 8/2018 |
| CN | 108583430 A | 9/2018 |
| JP | 2008140266 A | 6/2008 |
| JP | 2016027452 A | 2/2016 |
| JP | 2016539446 A | 12/2016 |
| JP | 2018133007 A | 8/2018 |

OTHER PUBLICATIONS

Intellectual Property Office of Singapore, Written Opinion Issued in Application No. 11202009437S, dated Dec. 6, 2021, 8 pages.
Japanese Patent Office, Office Action Issued in Application No. 2020-571644, dated Feb. 16, 2022, 6 pages.

* cited by examiner

DRIVING STATE DETECTION METHOD AND APPARATUS, DRIVER MONITORING SYSTEM AND VEHICLE

CROSS REFERENCE TO RELATED APPLICATIONS

The present disclosure is a continuation of International Application No. PCT/CN2019/111931, filed on Oct. 18, 2019, which claims a priority of Chinese Patent Application No. CN 201811224308.9, filed on Oct. 19, 2018, all of which are incorporated herein by reference in their entirety.

TECHNICAL FIELD

The present disclosure relates to the computer vision technology, and in particular, to a driving state detection method and apparatus, a driver monitoring system and a vehicle.

BACKGROUND

With the continuous popularization of vehicles, traffic accidents also increase, and the driving state of drivers has a serious impact on safe driving. If the driving state of the driver is poor, for example, if the driving state is poor due to excessive fatigue, insufficient sleep, distracted attention, etc., it may lead to a decline in judgment ability, delay in response, and even trance or instant memory loss, resulting in unsafe factors such as delayed or premature driving actions, stalled operations or improper correction time, and as a result, road traffic accidents are easy to happen. During driving, if the driver's attention is distracted by other things, such as a mobile phone, the driving safety hazards are increased.

SUMMARY

Embodiments of the present disclosure provide technical solutions for driving state detection.

According to one aspect of the embodiments of the present disclosure, provided is a driving state detection method, including:

performing head pose detection and eye state detection on a driver image to obtain head pose information and eye state information; and determining detection results of fatigue state and distraction state of a driver according to the head pose information and the eye state information.

According to another aspect of the embodiments of the present disclosure, provided is a driving state detection apparatus, including:

a first detection module, configured to perform head pose detection and eye state detection on a driver image to obtain head pose information and eye state information; and a first determination module, configured to determine detection results of fatigue state and distraction state of a driver according to the head pose information and the eye state information.

According to yet another aspect of the embodiments of the present disclosure, provided is a driver monitoring system, including:

a display device, configured to display a driver image, and detection results of fatigue state and distraction state of a driver; and a driver state detection apparatus, configured to perform head pose detection and eye state detection on a driver image to obtain head pose information and eye state information; and determine detection results of fatigue state and distraction state of the driver according to the head pose information and the eye state information.

According to yet another aspect of the embodiments of the present disclosure, provided is an electronic device, including:

a memory, configured to store a computer program; and a processor, configured to execute the computer program stored in the memory, where the driving state detection method according to any of the foregoing embodiments is implemented when the computer program is executed.

According to still another aspect of the embodiments of the present disclosure, provided is a computer-readable storage medium having a computer program stored thereon, where when the computer program is executed by a processor, the driving state detection method according to any one of the foregoing embodiments is implemented.

According to still another aspect of the embodiments of the present disclosure, provided is a vehicle, including a central control system, and further including the driving state detection apparatus according to any of the foregoing embodiments, or the driver monitoring system according to any of the foregoing embodiments.

Based on the driving state detection method and apparatus, the driver monitoring system, the vehicle, the electronic device, and the medium provided in the foregoing embodiments of the present disclosure, head pose detection and eye state detection may be performed on the driver image, and detection results of fatigue state and distraction state of the driver are determined according to the detected head pose information and eye state information. In the embodiments of the present disclosure, by performing head pose detection and eye state detection on the driver image, a joint and real-time detection of the fatigue state and distraction state of the driver is implemented, so that corresponding measures are taken in time when the driver's driving state is poor, thereby improving the driving safety and reducing the occurrence of road traffic accidents.

The technical solutions of the present disclosure are further described below in detail with reference to the accompanying drawings and embodiments.

BRIEF DESCRIPTION OF THE DRAWINGS

The accompanying drawings constituting a part of the description describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION OF THE EMBODIMENTS

Figure 1:
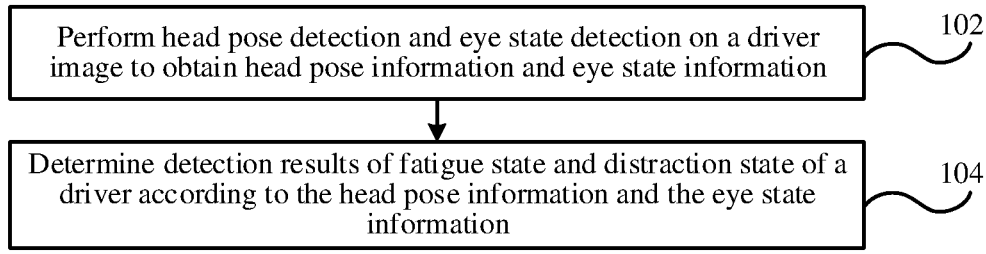
FIG. 1 is a flowchart of one embodiment of a driving state detection method according to the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

It should be understood that the terms such as "first" and "second" in the embodiments of the present disclosure are merely for distinguishing, and should not be construed as a limitation on the embodiments of the present disclosure.

It should also be understood that in the embodiments of the present disclosure, "multiple" may mean two or more, and "at least one" may mean one, or two or more.

It should also be understood that any component, data, or structure mentioned in the embodiments of the present disclosure may be generally understood as one or more when no specific limitation is imposed or no reverse enlightenment is given above or below.

It should also be understood that descriptions of the embodiments in the present disclosure emphasize differences between the embodiments. For a same or similar part, reference may be made to each other. For brevity, details are not described again.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the description in appropriate situations.

It should be noted that similar reference numerals and letters in the following accompanying drawings represent similar items. Therefore, once an item is defined in an accompanying drawing, the item does not need to be further discussed in the subsequent accompanying drawings.

In addition, the term "and/or" as used herein merely describes an association relationship between associated objects, indicating that there may be three relationships, for example, A and/or B, which may indicate that A exists separately, both A and B exist, and B exists separately. In addition, the character "I" in the present disclosure generally indicates that the related objects are in an "or" relationship.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, vehicle-mounted devices, personal computer systems, server computer systems, thin clients, thick clients, handheld or laptop devices, microprocessor-based systems, set top boxes, programmable consumer electronics, network personal computers, small computer systems, large computer systems, distributed cloud computing technology environments that include any one of the systems, and the like.

The electronic devices such as terminal devices, computer systems, and servers may be described in the general context of computer system executable instructions (such as, program modules) executed by the computer systems. Generally, the program modules may include routines, programs, target programs, components, logics, data structures, and the like for performing specific tasks or implementing specific abstract data types. The computer systems/servers may be practiced in the distributed cloud computing environments in which tasks are performed by remote processing devices that are linked through a communications network. In the distributed cloud computing environments, the program modules may be located in local or remote computing system storage media including storage devices.

The neural networks in the embodiments of the present disclosure may each be a multi-layer neural network (i.e., a deep neural network), where the neural network may be a multi-layer convolutional neural network, such as LeNet, AlexNet, GoogLeNet, VGG, ResNet and any other neural network models. The neural networks may be neural networks of the same type and structure, or neural networks of different types and/or structures. This is not limited in the embodiments of the present disclosure.

The neural networks in the embodiments of the present disclosure may each be a multi-layer neural network (i.e., a deep neural network), where the neural network may be a multi-layer convolutional neural network, such as LeNet, AlexNet, GoogLeNet, VGG, ResNet and any other neural network models. The neural networks may be neural networks of the same type and structure, or neural networks of different types and/or structures. This is not limited in the embodiments of the present disclosure.

FIG. 1 is a flowchart of one embodiment of a driving state detection method according to the present disclosure. The driving state detection method in the embodiments of the present disclosure may be implemented by means of one apparatus (called a driving state detection apparatus in the embodiments of the present disclosure) or one system (called a driver monitoring system in the embodiments of the present disclosure). As shown in FIG. 1, the driving state detection method in this embodiment includes the following steps.

At 102, head pose detection and eye state detection are performed on a driver image to obtain head pose information and eye state information.

In some implementations, operation 102 may include: performing face key point detection on the driver image; and obtaining the head pose information and the eye state information according to detected face key points.

In some optional examples, when the head pose information is obtained according to the detected face key points, the head pose information may be obtained, for example, by means of a first neural network based on the face key points.

In some implementations, the head pose may be expressed by a pose angle/Euler angle of the head in a normalized spherical coordinate system (i.e., a camera coordinate system where the camera is located) in a normal driving state, where the pose angle/Euler angle includes: a pitch angle θ (pitch), a yaw angle ψ (yaw), and a roll angle Φ (roll). The head pose information includes: (pitch, yaw, roll). The pitch angle is used to indicate an angle at which the face is lowered or raised in the vertical direction, the yaw angle is used to indicate an angle of the side face (i.e., head turn) in the horizontal direction, and the roll angle is used to indicate an angle at which the face is tilted (i.e., leaned toward the shoulder) in the vertical direction.

In the case of a fixed face size, taking a possible application scenario as an example, when the camera that captures the driver image is located directly in front of the driver's location and directly faces the driver's location, the smaller the yaw angle, the pitch angle, and the roll angle are, a more frontal face is presented, and the better the driving state of the driver is. The situation in which the yaw angle, pitch angle, and roll angle are all 0 is set as a reference head pose, and in this case, the driver is in the best driving state. When the pitch angle and/or yaw angle is greater than a preset angle threshold and the duration is greater than a preset time threshold, the detection result of distraction state of the driver may be determined as a distraction state (i.e., inattention). When the pitch angle changes from 0 degree to a certain angle and then returns to 0 degree within a preset short period of time (corresponding to a nap nodding action that the head suddenly lowers from a normal location and then returns to the normal location), the detection result of fatigue state of the driver may be determined as a fatigue state (i.e., a fatigue driving level). For application scenarios where the camera is located at other locations, the head pose information may be determined based on an included angle between the camera at the location and the camera located directly in front of the driver's location and directly facing the driver's location as the reference head pose. A person skilled in the art knows specific implementation based on the embodiments of the present disclosure, and details are not described herein again.

The first neural network may be pre-trained based on deep learning technology. In this embodiment, the first neural network is used to obtain head pose information based on face key points, which may improve the accuracy of the obtained head pose information, thereby improving the accuracy of detection results of driver states.

In addition, face key point detection may also be performed by means of a pre-trained neural network, so as to improve the accuracy of a face key point detection result and further improve the accuracy of head pose information, thereby improving the accuracy of detection results of driver states.

In some optional examples, obtaining the eye state information according to the detected face key points may, for example, include: determining an eye region image in the driver image according to the face key points; performing detections of an upper eyelid line and a lower eyelid line on the eye region image based on a second neural network; and determining eye open/closed state information of the driver according to a spacing between the upper eyelid line and the lower eyelid line. The eye open/closed state includes an eye open state, an eye semi-closed state, or an eye closed state. The eye state information includes the eye open/closed state information. In one optional example, the eyes in the driver image are first positioned by using an eye key point in the face key points (e.g., coordinate information of the eye key point in the driver image), to obtain an eye region image, and an upper eyelid line and a lower eyelid line are obtained by using the eye region image, and eye open/closed state information is obtained by computing the spacing between the upper eyelid line and the lower eyelid line. Alternatively, in another optional example, face key point detection may also be performed on the driver image, and computation is performed by directly using an eye key point in detected face key points, so as to obtain eye open/closed state information according to the computation result. The eye open/closed state information may be used to detect eye closure of the driver, for example, whether the driver's eyes are semi-closed ("semi-" represents a state that the eyes are not completely closed, for example, squinting in a sleepy state and the like), whether the driver's eyes are closed, the number of eye closures, the eye closure amplitude and the like. Optionally, the eye open/closed state information is information obtained by normalization processing of the amplitude of eye opening.

The second neural network may be pre-trained based on deep learning technology. In this embodiment, an upper eyelid line and a lower eyelid line are detected by using the second neural network, so as to implement accurate detection of the upper eyelid line and lower eyelid line locations, thereby improving the accuracy of eye open/closed state information, so as to improve the accuracy of detection results of driver states.

In addition, in some other optional examples, obtaining the eye state information according to the detected face key points may, for example, include: determining an eye region image in the driver image according to the face key points; and performing eye open/closed classification processing on the eye region image based on a third neural network, to obtain an eye open classification result or an eye closed classification result, which correspondingly represents that the eyes are in an eye open state or an eye closed state. The eye state information includes an eye open state or an eye closed state corresponding to the eye open classification result or the eye closed classification result. For example, the third neural network may perform feature extraction and eye open/closed classification processing on the input eye region image, and output a classification result of an eye open probability (the value range may be 0-1) or an eye closed probability (the value range may be 0-1), and it is determined based on the eye open probability or the eye closed probability that the eyes are in the eye open state or the eye closed state, thereby obtaining the driver's eye state.

The third neural network may be trained directly using an eye open sample image and an eye closed sample image based on the deep learning technology. The trained third neural network may directly obtain an eye open classification result or an eye closed classification result for an input image, without computing the eye open/closure degree. In this embodiment, the eye state of a driver in an eye region image is obtained based on the third neural network, which may improve the accuracy and detection efficiency of eye state information, thereby improving the accuracy and detection efficiency of detection results of driver states.

In one optional example, operation 102 may be performed by a processor by invoking a corresponding instruction stored in a memory, or may be performed by a first detection module run by the processor.

At 104, detection results of fatigue state and distraction state of a driver are determined according to the head pose information and the eye state information.

In some implementations, operation 104 may include: determining a parameter value of an index for representing the fatigue state of the driver and a parameter value of an index for representing the distraction state of the driver according to the head pose information and the eye state information; and determining the detection result of fatigue state of the driver according to the parameter value of the index for representing the fatigue state of the driver, and determining the detection result of distraction state of the driver according to the parameter value of the index for representing the distraction state of the driver.

In one optional example, operation 104 may be performed by a processor by invoking a corresponding instruction stored in a memory, or may be performed by a first determination module run by the processor.

Based on the driving state detection method provided in the foregoing embodiments of the present disclosure, head pose detection and eye state detection may be performed on a driver image, and detection results of fatigue state and distraction state of the driver are determined according to the detected head pose information and eye state information. In the embodiments of the present disclosure, by performing head pose detection and eye state detection on a driver image, a joint and real-time detection of the fatigue state and distraction state of the driver is implemented, so that corresponding measures are taken in time when the driver's driving state is poor, thereby improving the driving safety and reducing the occurrence of road traffic accidents.

In addition, in another embodiment of the driving state detection method according to the present disclosure, after operation 102, the method may also include:

determining whether a deviation angle of a head location of the driver exceeds a preset range according to head location information of the driver in the driver image determined based on the head pose information;

if the deviation angle of the head location of the driver does not exceed the preset range, executing operation 104, i.e., determining the detection results of fatigue state and distraction state of the driver according to the head pose information and the eye state information; and/or, if the deviation angle of the head location of the driver exceeds the preset range, determining a detection result of distraction state of the driver according to the head pose information and the eye state information.

In some implementations, determining the detection result of distraction state of the driver according to the head pose information and the eye state information may include: determining a parameter value of an index for representing the distraction state of the driver according to the head pose information and the eye state information; and determining the detection result of distraction state of the driver according to the parameter value of the index for representing the distraction state of the driver.

In addition, in the embodiments of the drive state detection method according to the present disclosure, the method may further include: performing mouth state detection on the driver image to obtain mouth state information. Accordingly, in this embodiment, the parameter value of the index for representing the fatigue state of the driver is determined according to the head pose information, the eye state information, and the mouth state information.

In some implementations, performing mouth state detection on the driver image to obtain the mouth state information may include: performing face key point detection on the driver image; and obtaining the mouth state information according to detected face key points.

In some optional examples, obtaining the mouth state information according to the detected face key points may, for example, include: determining a mouth region image in the driver image according to the face key points; performing detections of an upper lip line and a lower lip line on the mouth region image based on a fourth neural network; and determining mouth open/closed state information of the driver according to a spacing between the upper lip line and the lower lip line. The mouth open/closed state may include an open state (i.e., a mouth open state), a closed state (i.e., a mouth closed state), a semi-closed state (i.e., a mouth semi-opened state), and the like of the mouth. The mouth state information includes the mouth open/closed state information. For example, in one optional example, the mouth in the driver image is first positioned by using a mouth key point in the face key points (e.g., coordinate information of the mouth key point in the driver image). A mouth region image may be obtained by cutting and the like, and the upper lip line and the lower lip line may be obtained by using the mouth region image. Mouth open/closed state information is obtained by computing the spacing between the upper lip line and the lower lip line. In another optional example, a mouth key point in the face key points is directly used for computation, and mouth open/closed state information is obtained according to the computation result.

The mouth open/closed state information may be used to perform yawn detection of the driver, for example, detecting whether the driver yawns, the number of yawns, etc. Optionally, the mouth open/closed state information is information obtained by normalization processing of the amplitude of mouth opening.

The fourth neural network may be pre-trained based on deep learning technology. In this embodiment, the upper lip line and the lower lip line are detected by using the fourth neural network, so as to implement accurate detection of the upper lip line and lower lip line locations, thereby improving the accuracy of mouth open/closed state information, so as to improve the accuracy of detection results of driver states.

In some other optional examples, obtaining the mouth state information according to the detected face key points may, for example, include: determining a mouth region image in the driver image according to the face key points; and performing mouth open/closed classification processing on the mouth region image based on a fifth neural network, to obtain a mouth open classification result or a mouth closed classification result, which correspondingly represents that the mouth is in a mouth open state or a mouth closed state. The mouth state information includes the mouth open state or the mouth closed state. For example, the fifth neural network may perform feature extraction and mouth open/closed classification processing on the input mouth region image, and output a mouth open (i.e., the mouth open state) probability (the value range may be 0-1) or a mouth closed (i.e., the mouth closed state) probability (the value range may be 0-1), and it is determined based on the mouth open probability or the mouth closed probability that the mouth is in the mouth open state or the mouth closed state, thereby obtaining the mouth state information of the driver.

The fifth neural network may be trained directly using a mouth open sample image and a mouth closed sample image based on the deep learning technology. The trained fifth neural network may directly obtain a mouth open classification result or a mouth closed classification result for an input image, without detecting the upper lip line and the lower lip line and computing the spacing therebetween. In this embodiment, the mouth state information of the driver in the mouth region image is obtained based on the fifth neural network, which may improve the accuracy and detection efficiency of mouth state information, thereby improving the accuracy and detection efficiency of detection results of driver states.

Figure 2:
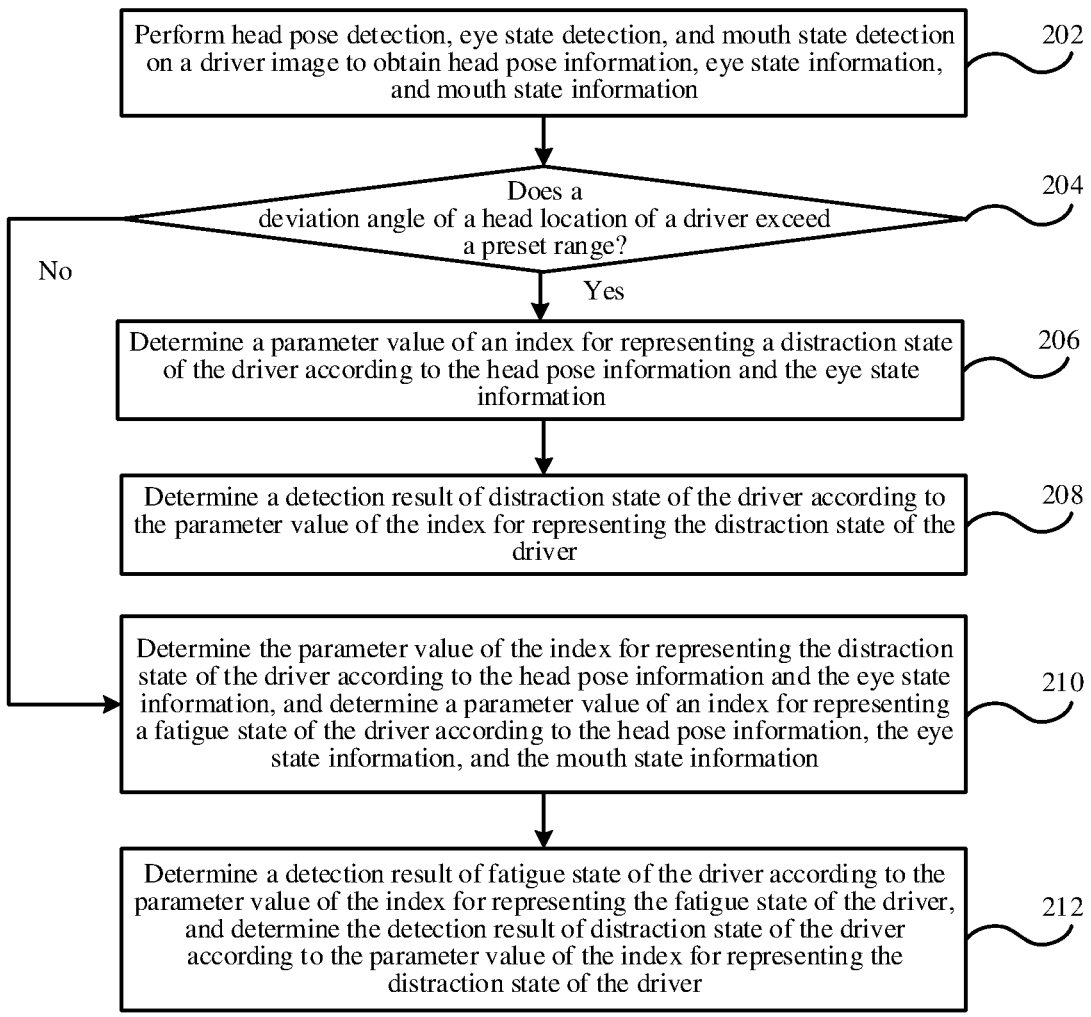
FIG. 2 is a flowchart of another embodiment of a driving state detection method according to the present disclosure.

FIG. 2 is a flowchart of another embodiment of a driving state detection method according to the present disclosure. As shown in FIG. 2, the driving state detection method in this embodiment includes the following steps.

At 202, head pose detection, eye state detection, and mouth state detection are performed on a driver image to obtain head pose information, eye state information, and mouth state information.

In one optional example, operation 202 may be performed by a processor by invoking a corresponding instruction stored in a memory, or may be performed by a first detection module run by the processor.

At 204, whether a deviation angle of a head location of a driver exceeds a preset range is determined according to head location information of the driver in the driver image determined based on the head pose information.

In one optional example, operation 204 may be performed by a processor by invoking a corresponding instruction stored in a memory, or may be performed by a second determination module run by the processor.

If the deviation angle of the head location of the driver exceeds the preset range, operation 206 is performed. Otherwise, if the deviation angle of the head location of the driver does not exceed the preset range, operation 210 is performed.

At 206, a parameter value of an index for representing a distraction state of the driver is determined according to the head pose information and the eye state information.

At 208, a detection result of distraction state of the driver is determined according to the parameter value of the index for representing the distraction state of the driver.

In one optional example, operations 206-208 may be performed by a processor by invoking a corresponding instruction stored in a memory, or may be performed by a first determination module or a first determination unit in the first determination module run by the processor.

After operation 208, subsequent process of this embodiment is not performed.

At 210, a parameter value of an index for representing a distraction state of the driver is determined according to the head pose information and the eye state information, and a parameter value of an index for representing a fatigue state of the driver is determined according to the head pose information, the eye state information, and the mouth state information.

At 212, a detection result of fatigue state of the driver is determined according to the parameter value of the index for representing the fatigue state of the driver, and a detection result of distraction state of the driver is determined according to the parameter value of the index for representing the distraction state of the driver.

In one optional example, operations 210-212 may be performed by a processor by invoking a corresponding instruction stored in a memory, or may be performed by a first determination module or a second determination unit in the first determination module run by the processor.

In the foregoing embodiments, when the deviation angle of the head location exceeds the preset range, the driver may be in a distraction state. Therefore, only distraction state detection is performed on the driver, and no fatigue state detection is performed, and thus the effect of driving state detection may be implemented, thereby saving computing resources required for fatigue state detection and improving the efficiency of driving state detection. When the deviation angle of the head location does not exceed the preset range, the driver may be in a distraction state and/or a fatigue state. Therefore, distraction state detection and fatigue state detection may be performed on the driver simultaneously, which may implement comprehensive detection of driver states to ensure driving safety.

In some implementations, the index for representing the fatigue state of the driver may, for example, include, but is not limited to, any one or more of the following: a nap degree, an eye closure degree, a blink degree, a yawning degree, etc.; and/or, the index for representing the distraction state of the driver may, for example, include, but is not limited to, any one or more of the following: a head location deviation degree, a face orientation deviation degree, a gaze direction deviation degree, a daze degree, etc.

In some implementations, in the embodiments, determining the parameter value of the index for representing the distraction state of the driver according to the head pose information and the eye state information may include:

determining the head location of the driver in the driver image according to the head pose information to obtain head location information, for example, obtaining a pitch angle in the head pose information as the head location; and obtaining a parameter value of a head location deviation degree according to the head location information within a period of time, where the parameter value of the head location deviation degree may, for example, include, but is not limited to, any one or more of the following: a head location deviation state, a head location deviation direction, a deviation angle of the head location in the head location deviation direction, a head location deviation duration, or a head location deviation frequency; and/or, determining face orientation of the driver in the driver image according to the head pose information to obtain face orientation information, where the face orientation information may, for example, include the direction and angle of face turning, and the turning direction herein may be turning to the left, turning to the right, turning down, and/or turning up and the like, for example, a pitch angle and a yaw angle in the head pose information may be obtained as the face orientation; and obtaining a parameter value of a face orientation deviation degree according to the face orientation information within a period of time, where the parameter value of the face orientation deviation degree may, for example, include, but is not limited to, any one or more of the following: the number of head turns, a head turn duration, or a head turn frequency; and/or, determining a gaze direction of the driver in the driver image according to the head pose information to obtain gaze direction information, and obtaining a parameter value of a gaze direction deviation degree according to the gaze direction information within a period of time; or determining an eye region image in the driver image according to the face key points, obtaining gaze direction information of the driver in the eye region image based on a sixth neural network, and obtaining a parameter value of a gaze direction deviation degree according to the gaze direction information within a period of time, where the parameter value of the gaze direction deviation degree may, for example, include, but is not limited to, any one or more of the following: a gaze direction deviation angle, a gaze direction deviation duration, or a gaze direction deviation frequency; and/or, obtaining a parameter value of a daze degree according to the eye state information within a period of time, where the parameter value of the daze degree may, for example, include, but is not limited to, any one or more of the following: an eye open amplitude, an eye open duration, a ratio of an eye open cumulative duration to a statistical time window, etc.

In this embodiment, a parameter value of any one or more indexes for representing a distraction state of a driver in a driver image is detected, and a detection result of distraction state of the driver is determined according to the parameter value, so as to determine whether the driver concentrates on driving. Quantifying the driving attention degree into at least one of the indexes such as a head location deviation degree, a face orientation deviation degree, a gaze direction deviation degree, and a daze degree by performing quantification on the index for representing the distraction state of the driver is beneficial to evaluate the driving attention state of the driver in time and objectively.

In some implementations, in the embodiments, determining the parameter value of the index for representing the fatigue state of the driver and the parameter value of the index for representing the distraction state of the driver according to the head pose information and the eye state information includes:

determining the head location of the driver in the driver image according to the head pose information to obtain head location information, for example, obtaining a pitch angle in the head pose information as the head location; and obtaining a parameter value of a head location deviation degree according to the head location information within a period of time, where the parameter value of the head location deviation degree may, for example, include, but is not limited to, any one or more of the following: a head location deviation state, a head location deviation direction, a deviation angle of the head location in the head location deviation direction, a head location deviation duration, or a head location deviation frequency; and/or, determining face orientation of the driver in the driver image according to the head pose information to obtain face orientation information, for example, obtaining the pitch angle and the yaw angle in the head pose information as the face orientation; and obtaining a parameter value of a face orientation deviation degree according to the face orientation information within a period of time, where the parameter value of the face orientation deviation degree may, for example, include, but is not limited to, any one or more of the following: the number of head turns, a head turn duration, or a head turn frequency; and/or, determining a gaze direction of the driver in the driver image according to the head pose information to obtain gaze direction information, and obtaining a parameter value of a gaze direction deviation degree according to the gaze direction information within a period of time; or determining an eye region image in the driver image according to the face key points, obtaining gaze direction information of the driver in the eye region image based on a sixth neural network, and obtaining a parameter value of a gaze direction deviation degree according to the gaze direction information within a period of time, where the parameter value of the gaze direction deviation degree may, for example, include, but is not limited to, any one or more of the following: a gaze direction deviation angle, a gaze direction deviation duration, or a gaze direction deviation frequency; and/or, obtaining a parameter value of a daze degree according to the eye state information within a period of time, where the parameter value of the daze degree may, for example, include, but is not limited to, any one or more of the following: an eye open amplitude, an eye open duration, a ratio of an eye open cumulative duration to a statistical time window, etc.; and/or, determining the head location of the driver in the driver image according to the head pose information to obtain head location information, and obtaining a parameter value of a nap degree according to the head location information within a period of time, where the parameter value of the nap degree may, for example, include, but is not limited to, any one or more of the following: a nap nodding state, a nap nodding amplitude, the number of nap nods, a nap nodding frequency, or a nap nodding duration; and/or, obtaining a parameter value of an eye closure degree according to the eye state information within a period of time, where the parameter value of the eye closure degree may, for example, include, but is not limited to, any one or more of the following: the number of eye closures, an eye closure frequency, an eye closure duration, an eye closure amplitude, the number of eye semi-closures, an eye semi-closure frequency, a ratio of an eye closure cumulative duration to the statistical time window, etc.; and/or, obtaining a parameter value of a blink degree according to the eye state information within a period of time, where in the embodiments of the present disclosure, according to the eye state information, the process of the eye from an eye open state to an eye closed state and then to the eye open state may be considered as completing a blink action, and the time required for the blink action may be, for example, about 0.2-1 s, and the parameter value of the blink degree may, for example, include, but is not limited to, any one or more of the following: the number of blinks, a blink frequency, a blink duration, a ratio of a blink cumulative duration to the statistical time window, etc.; and/or, obtaining a parameter value of a yawning degree according to the mouth state information within a period of time, where the parameter value of the yawning degree may, for example, include, but is not limited to, any one or more of the following: a yawning state, the number of yawns, a yawn duration, a yawning frequency, etc.

In the foregoing embodiments, head pose information may be obtained based on deep learning technology, and the driver's head location, face orientation, and gaze direction in the driver image are determined according to the head pose information, which improves the accuracy of head location information, face orientation information, and gaze direction information, so that parameter values of indexes for representing driver states determined based on the head pose information are more accurate, thereby facilitating improving the accuracy of detection results of the driver states.

The head location information may be used to determine whether the driver's head location is normal, such as determining whether the driver lowers his head, raises his head, tilts his head, or turns his head. Optionally, the head location information may be determined by means of the pitch angle, yaw angle, and roll angle of the head. The face orientation information may be used to determine whether the driver's face direction is normal, for example, determining whether the driver turns his/her face or turns around and the like. Optionally, the face orientation information may be an included angle between the direct front of the face of the driver and the direct front of the vehicle driven by the driver. The foregoing gaze direction information may be used to determine whether the gaze direction of the driver is normal, for example, determining whether the driver gazes ahead and the like. The gaze direction information may be used to determine whether a deviation occurs in the gaze of the driver. Optionally, the gaze direction information may be an included angle between the gaze of the driver and the direct front of the vehicle driven by the driver.

In one optional example, if it is determined that the face orientation information is greater than a first orientation, and the phenomenon of being greater than the first orientation continues for N1 frames (for example, continuing for 9 frames, 10 frames or the like), it is determined that the driver has experienced a long-time large-angle head turn, the long-time large-angle head turn may be recorded, and the duration of this head turn may also be recorded. If it is determined that the face orientation information is not greater than the first orientation but is greater than a second orientation, and the phenomenon of being not greater than the first orientation but greater than the second orientation continues for N1 frames (N1 is an integer greater than 0, for example, continuing for 9 frames, 10 frames or the like), it is determined that the driver has experienced a long-time small-angle head turn, the long-time small-angle head turn may be recorded, and the duration of this head turn may also be recorded.

In one optional example, if it is determined that the included angle between the gaze direction information and the direct front of the vehicle is greater than a first included angle, and the phenomenon of being greater than the first included angle continues for N2 frames (for example, continuing for 8 frames, 9 frames or the like), it is determined that the driver has experienced a severe gaze deviation, the severe gaze deviation may be recorded, and the duration of this severe gaze deviation may also be recorded. If it is determined that the included angle between the gaze direction information and the direct front of the vehicle is not greater than the first included angle but is greater than a second included angle, and the phenomenon of being not greater than the first included angle but greater than the second included angle continues for N2 frames (N2 is an integer greater than 0, for example, continuing for 9 frames, 10 frames or the like), it is determined that the driver has experienced a gaze deviation, the gaze deviation may be recorded, and the duration of this gaze deviation may also be recorded.

In one optional example, the values of the foregoing first orientation, second orientation, first included angle, second included angle, N1, and N2 may be set according to actual situations, and the present disclosure does not limit the values.

In the foregoing embodiments, eye state information may be obtained based on deep learning technology, and a parameter value of an eye closure degree, a parameter value of a daze degree, and a parameter value of a blink degree are determined according to the eye state information, which improves the accuracy of the parameter value of the eye closure degree, the parameter value of the daze degree, and the parameter value of the blink degree, so that the parameter values of the indexes for representing driver states determined based on the eye state information are more accurate, thereby facilitating improving the accuracy of detection results of the driver states.

In the foregoing embodiments, mouth state information may be obtained based on deep learning technology, and a parameter value for representing a yawning degree is determined according to the mouth state information, which improves the accuracy of the parameter value of the yawning degree, so that the parameter values of the indexes for representing driver states determined based on the mouth state information are more accurate, thereby facilitating improving the accuracy of detection results of the driver states.

In the foregoing embodiments, the sixth neural network may be obtained based on deep learning technology and trained with sample images in advance. The trained sixth neural network may directly output gaze direction information for an input image, so as to improve the accuracy of the gaze direction information, thereby improving the accuracy of detection results of driver states.

The sixth neural network may be trained by a variety of approaches, which is not limited in the present disclosure. For example, in one approach, a first gaze direction may be determined according to a camera that captures a sample image and a pupil in the sample image; the sample image includes at least an eye image; the gaze direction in the sample image is detected by means of the sixth neural network, to obtain a first detected gaze direction; and the sixth neural network is trained according to the first gaze direction and the first detected gaze direction. For another example, in one approach, a first coordinate of a pupil reference point in a sample image in a first camera coordinate system is determined, and a second coordinate of a corneal reference point in the sample image in the first camera coordinate system is determined; the sample image includes at least an eye image; a second gaze direction in the sample image is determined according to the first coordinate and the second coordinate; gaze direction detection is performed on the sample image by means of the sixth neural network to obtain a second detected gaze direction; and the sixth neural network is trained according to the second gaze direction and the second detected gaze direction.

In some optional examples, determining the gaze direction of the driver in the driver image according to the head pose information to obtain the gaze direction information may include: determining a pupil edge location according to an eye image positioned by an eye key point in the face key points, and computing a pupil center location according to the pupil edge location; obtaining eyeball rotation angle information in a head pose corresponding to the head pose information according to the pupil center location and an eye center location; and determining the gaze direction of the driver according to the head pose information and the eyeball rotation angle information to obtain the gaze direction information.

Determining the pupil edge location according to the eye image positioned by the eye key point in the face key points may include: performing pupil edge location detection on the eye image in the image divided according to the face key points based on a seventh neural network, and obtaining the pupil edge location according to information output by the seventh neural network.

As one optional example, an eye image may be cut from the drive image and enlarged, and the cut and enlarged eye image is provided to the seventh neural network for pupil positioning to perform pupil key point detection and output a detected pupil key point. A pupil edge location is obtained according to the pupil key point output by the seventh neural network, and a pupil center location may be obtained by computation according to the pupil edge location (for example, computing the center location).

As one optional example, the eye center location may be obtained based on an upper eyelid line and a lower eyelid line. For example, coordinate information of all key points of the upper eyelid line and the lower eyelid line are added, and then divided by the number of all key points of the upper eyelid line and the lower eyelid line, and the coordinate information obtained after the division is used as the eye center location. Certainly, other approaches may also be used to obtain the eye center location. For example, computation is performed on the eye key point in the detected face key points to obtain the eye center location. The present disclosure does not limit the implementation of obtaining the eye center location.

In this embodiment, a more accurate pupil center location may be obtained by obtaining the pupil center location based on pupil key point detection, and a more accurate eye center location may be obtained by obtaining the eye center location based on eyelid line positioning, so that accurate gaze direction information may be obtained when a gaze direction is determined by using the pupil center location and the eye center location. In addition, a pupil center location is positioned by using pupil key point detection, and a gaze direction is determined by using the pupil center location and the eye center location, so that the implementation of determining the gaze direction is accurate and easy to achieve.

In one optional example, the present disclosure may employ existing neural networks to implement detection of a pupil edge location and detection of an eye center location.

The seventh neural network may be pre-trained based on deep learning technology. In this embodiment, detection of a pupil edge location is performed by using the seventh neural network to implement accurate detection of the pupil edge location, thereby improving the accuracy of gaze direction information.

In one optional example, when the parameter value of the gaze direction deviation degree is obtained according to the gaze direction information within a period of time, the parameter value of the gaze direction deviation degree is obtained according to a deviation angle of the gaze direction information with respect to a reference gaze direction within the period of time.

The reference gaze direction may be preset, or an average gaze direction determined based on the first N driver image frames in a video where the driver image is located is taken as the reference gaze direction. N is an integer greater than 1.

In the embodiments of the present disclosure, it is considered that the driver is in a daze state when the eyes are in an eye open state for a period of time. In one optional example, obtaining the parameter value of the daze degree according to the eye state information within the period of time may include: determining, according to the eye state information, that the driver is in a daze state when the eyes of the driver are in an eye open state for a preset period of daze time; and obtaining the parameter value of the daze degree according to the eye state information within the period of time. The period of time includes the preset period of daze time.

In the embodiments of the present disclosure, the process that the head suddenly lowers from a normal head location and then returns to the normal head location (that is, the pitch angle in the head pose information changes from 0 degree in a normal driving state to a certain angle and then returns to 0 degree within a preset short period of time) may be considered as a nap nod. In one optional example, obtaining the parameter value of the nap degree according to the head location information within the period of time may include: determining, according to the head location information, that the driver is in a nap state when the head location of the driver has a deviation degree with respect to a preset reference head location reaching a preset deviation range within a first preset period of time and returns to the preset reference head location within a second preset period of time; and obtaining the parameter value of the nap degree according to the head location information within the period of time, where the period of time includes the first preset period of time and the second preset period of time.

In the embodiments of the present disclosure, the process that the mouth changes from the closed state to the open state and then to the closed state is considered as a yawn action, and the time required for one yawn action is generally greater than 400 ms. In one optional example, obtaining the parameter value of the yawning degree according to the mouth state information within the period of time may include: determining, according to the mouth state informa-tion, that the driver completes a yawn action when the time that the mouth of the driver changes from a mouth closed state to a mouth open state and then returns to the mouth closed state is within a preset time range; and obtaining the parameter value of the yawning degree according to the mouth state information within the period of time. The period of time includes the time that the mouth of the driver changes from the mouth closed state to the mouth open state and then returns to the mouth closed state.

In some implementations, determining the detection result of fatigue state of the driver according to the parameter value of the index for representing the fatigue state of the driver may include: determining that the detection result of fatigue state of the driver is a fatigue state when any one or more of the parameter values of the indexes for representing the fatigue state of the driver satisfy a predetermined fatigue condition; and/or, determining that the detection result of fatigue state of the driver is a non-fatigue state when all the parameter values of the indexes for representing the fatigue state of the driver do not satisfy the predetermined fatigue condition.

The predetermined fatigue condition includes multiple fatigue level conditions. Accordingly, determining that the detection result of fatigue state of the driver is the fatigue state when any one or more of the parameter values of the indexes for representing the fatigue state of the driver satisfy the predetermined fatigue condition includes: determining a fatigue state level according to a fatigue level condition satisfied by the parameter value of the index for representing the fatigue state of the driver; and taking the determined fatigue state level as the detection result of fatigue state of the driver.

In this embodiment, the detection result of fatigue state of the driver is represented as a fatigue driving degree. The fatigue driving degree may, for example, include: a normal driving level (i.e., a non-fatigue state level) and a fatigue driving level (i.e., a fatigue state level), where the fatigue driving level may be one fatigue state level, or may be divided into multiple different fatigue state levels, for example, the foregoing fatigue driving level may be divided into a fatigue prompt level (also called a mild fatigue level) and a fatigue warning level (also called a severe fatigue level). In addition, the fatigue driving degree may also be divided into more levels, for example, a mild fatigue level, a moderate fatigue level, and a severe fatigue level and the like. The present disclosure does not limit different fatigue state levels included in the fatigue driving degree.

In one optional example, each fatigue state level included in the fatigue driving degree corresponds to a fatigue level condition, and a fatigue state level corresponding to a fatigue level condition that satisfied by the parameter value of the index for representing the fatigue state of the driver, or a non-fatigue state where the parameter value of the index for representing the fatigue state of the driver does not satisfy all the fatigue level conditions may be determined as the fatigue driving degree.

In one optional example, preset conditions corresponding to the normal driving level (i.e., the non-fatigue state) (that is, the predetermined fatigue condition is not satisfied) may include:

condition 20*a*, there is no eye semi-closure and eye closure; and condition 20*b*, there is no yawn.

In a case where the conditions 20*a* and 20*b* are both satisfied, the driver is currently in the normal driving level (i.e., the non-fatigue state).

In one optional example, fatigue level conditions corresponding to the fatigue prompt level may include:
  condition 20c, there is an eye semi-closure; and
  condition 20d, there is a yawn.
In a case where any of the conditions 20a and 20d is satisfied, the driver is currently in the fatigue prompt level.

In one optional example, fatigue level conditions corresponding to the fatigue warning level may include:
  condition 20d: there is an eye closure, or the number of eye closures within a period of time reaches a preset number of times, or the time of eye closure within a period of time reaches a preset time; and
  condition 20e: the number of yawns within a period of time reaches a preset number of times.
In a case where any of the conditions 20d and 20e is satisfied, the driver is currently in the fatigue warning level.

In some implementations, determining the detection result of distraction state of the driver according to the parameter value of the index for representing the distraction state of the driver may include: determining that the detection result of distraction state of the driver is a distraction state when any one or more of the parameter values of the indexes for representing the distraction state of the driver satisfy a predetermined distraction condition; and/or, determining that the detection result of distraction state of the driver is a non-distraction state when all the parameter values of the indexes for representing the distraction state of the driver do not satisfy the predetermined distraction condition.

The predetermined distraction condition includes multiple distraction level conditions. Accordingly, determining that the detection result of distraction state of the driver is the distraction state when any one or more of the parameter values of the indexes for representing the distraction state of the driver satisfy the predetermined distraction condition includes: determining a distraction state level according to a distraction level condition satisfied by the parameter value of the index for representing the distraction state of the driver; and taking the determined distraction state level as the detection result of distraction state of the driver.

In this embodiment, the detection result of distraction state of the driver may be represented as a distraction driving degree. The distraction driving degree may include, for example, that the driver's attention is concentrated (the driver's attention is not distracted, i.e., the non-distraction state), and that the driver's attention is distracted (the distraction state). For example, if the gaze direction deviation angle, the face orientation deviation angle, and the head location deviation angle are all smaller than a first preset angle, and the eye open duration is shorter than a first preset duration, the driver's attention is concentrated (the driver's attention is not distracted, i.e., the non-distraction state). The driver distraction level may, for example, include that the driver's attention is slightly distracted, and the driver's attention is moderately distracted, the driver's attention is severely distracted and the like. The driver distraction level may be determined by the distraction level condition satisfied by the parameter value of the index for representing the distraction state of the driver. For example, if any of the gaze direction deviation angle, the face orientation deviation angle, and the head location deviation angle is not less than the preset angle, and the duration is not greater than the first preset duration and less than a second preset duration, or the eye open duration is not greater than the first preset duration and less than the second preset duration, the driver's attention is slightly distracted. If either of the gaze direction deviation angle and the face orientation deviation angle is not less than a preset angle, and the duration is not greater than the second preset duration and less than a third preset duration, or the eye open duration is not greater than the second preset duration and less than the third preset duration, the driver's attention is moderately distracted. If either of the gaze direction deviation angle and the face orientation deviation angle is not less than the preset angle, and the duration is not less than the third preset duration, or the eye open duration is not less than the third preset duration, the driver's attention is severely distracted.

Figure 3:
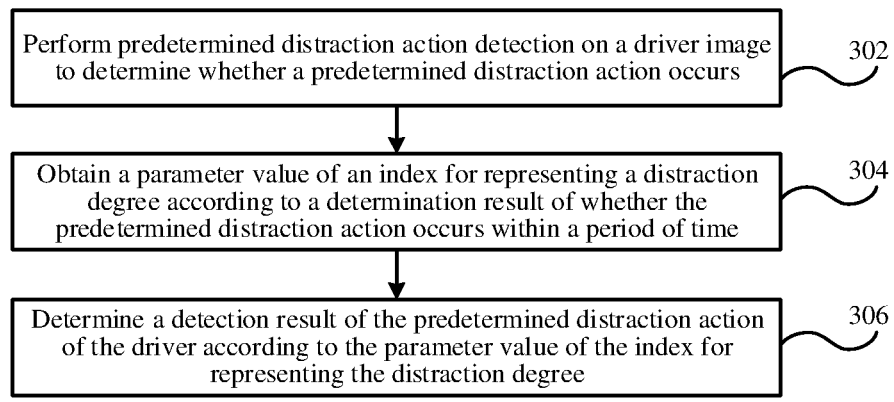
FIG. 3 is flowchart of one embodiment of performing predetermined distraction action detection on a driver image in embodiments of the present disclosure.

FIG. 3 is a flowchart of yet another embodiment of a driving state detection method according to the present disclosure. Compared to foregoing FIG. 1 or 2, the driving state detection method of this embodiment further includes a related operation for performing predetermined distraction action detection on the driver image. As shown in FIG. 3, the embodiment of performing predetermined distraction action detection on the driver image includes the following steps.

At 302, predetermined distraction action detection is performed on the driver image to determine whether a predetermined distraction action occurs.

The predetermined distraction action in the embodiments of the present disclosure may be any distraction action that may distract the driver, for example, a smoking action, a drinking action, an eating action, a calling action, an entertainment action, a makeup action and the like. The eating action is eating food, for example, fruit, snacks and the like. The entertainment action is any action executed with the aid of an electronic device, for example, sending messages, playing games, singing and the like. The electronic device is for example a mobile terminal, a handheld computer, a game machine and the like.

If a predetermined distraction action occurs, operation 304 is performed. Otherwise, if no predetermined distraction action occurs, subsequent process of this embodiment is not performed.

In one optional example, operation 302 may be performed by a processor by invoking a corresponding instruction stored in a memory, or may be performed by a second detection module run by the processor.

At 304, a parameter value of an index for representing a distraction degree of the driver is obtained according to a determination result of whether the predetermined distraction action occurs within a period of time.

The parameter value of the distraction degree may include, but is not limited to, any one or more of the following: the number of occurrences of the predetermined distraction action, a duration of the predetermined distraction action, a frequency of the predetermined distraction action, etc., e.g., the number of occurrences, duration and frequency of a smoking action; the number of occurrences, duration and frequency of a drinking action; the number of occurrences, duration and frequency of a calling action, and the like.

In one optional example, operation 304 may be performed by a processor by invoking a corresponding instruction stored in a memory, or may be performed by a first obtaining module run by the processor.

At 306, a detection result of the predetermined distraction action of the driver is determined according to the parameter value of the index for representing the distraction degree of the driver.

In one optional example, operation 306 may be performed by a processor by invoking a corresponding instruction stored in a memory, or may be performed by a third determination module run by the processor.

In some implementations, in operation 302, performing predetermined distraction action detection on the driver image to determine whether the predetermined distraction action occurs may include:

extracting a feature of the driver image;

extracting multiple candidate boxes that may include the predetermined distraction action based on the feature;

determining an action target box based on the multiple candidate boxes, where the action target box includes a local region of a face and an action interaction object, or further selectively includes a hand region; where the local region of the face may for example include, but is not limited to, any one or more of the following: a mouth region, an ear region, an eye region, etc.; and/or, the action interaction object may for example include, but is not limited to, any one or more of the following: a container, a cigarette, a mobile phone, food, a tool, a beverage bottle, eyeglasses, a mask, etc.; and performing classification detection of the predetermined distraction action based on the action target box to determine whether the predetermined distraction action occurs.

In some other implementations, in operation 302, performing predetermined distraction action detection on the driver image to determine whether the predetermined distraction action occurs may include: performing target object detection corresponding to the predetermined distraction action on the driver image to obtain a target object bounding box; and determining whether the predetermined distraction action occurs according to the target object bounding box.

This embodiment provides an implementation scheme for performing predetermined distraction action detection on the driver. By detecting a target object corresponding to a predetermined distraction action and determining whether the predetermined distraction action occurs according to a bounding box of the detected target object, whether the driver is distracted is determined, which is contributive to obtaining an accurate result of the driver's predetermined distraction action detection so as to improve the accuracy of the result of driver state detection.

For example, if the predetermined distraction action is a smoking action, performing predetermined distraction action detection on the driver image to determine whether the predetermined distraction action occurs may include: performing, by an eighth neural network, face detection on the driver image to obtain a face bounding box, and extracting feature information of the face bounding box; and determining, by the eighth neural network, whether a smoking action occurs according to the feature information of the face bounding box.

For another example, if the predetermined distraction action is an eating action/drinking action/calling action/entertainment action (i.e., an eating action and/or a drinking action and/or a calling action and/or an entertainment action)/makeup action, performing predetermined distraction action detection on the driver image to determine whether the predetermined distraction action occurs may include: performing, by a ninth neural network, preset target object detection corresponding to an eating action/drinking action/calling action/entertainment action/makeup action on the driver image to obtain a bounding box of a preset target object, where the preset target object includes hands, mouth, eyes, and an action interaction object, and the action interaction object includes, but is not limited to, any one or more types of the following: a container, food, an electronic device, cosmetics, etc.; and determining whether the predetermined distraction action occurs according to the bounding box of the preset target object, where the determination result of whether the predetermined distraction action occurs may include one of the following: no eating action/drinking action/calling action/entertainment action occurs; an eating action occurs; a drinking action occurs; a calling action occurs; an entertainment action occurs; or a makeup action occurs.

In some optional examples, if the predetermined distraction action is an eating action/drinking action/calling action/entertainment action (i.e., an eating action and/or a drinking action and/or a calling action and/or an entertainment action)/makeup action, determining whether the predetermined distraction action occurs according to the bounding box of the preset target object includes: determining whether the predetermined distraction action occurs according to whether a hand bounding box, a mouth bounding box, an eye bounding box, and an action interaction object bounding box are detected, whether the hand bounding box overlaps the action interaction object bounding box, the type of the action interaction object, and whether the distance between the action interaction object bounding box and the mouth bounding box or the eye bounding box satisfies a preset condition.

Optionally, if the hand bounding box overlaps the action interaction object bounding box, the type of the action interaction object is a container or food, and the action interaction object bounding box overlaps the mouth bounding box, it is determined that an eating action, a drinking action or a makeup action occurs; and/or, if the hand bounding box overlaps the action interaction object bounding box, the type of the action interaction object is an electronic device, and the minimum distance between the action interaction object bounding box and the mouth bounding box is less than a first preset distance, or the minimum distance between the action interaction object bounding box and the eye bounding box is less than a second preset distance, it is determined that an entertainment action or a calling action occurs.

In addition, if the hand bounding box, the mouth bounding box, and any action interaction object bounding box are not detected simultaneously, and the hand bounding box, the eye bounding box, and any action interaction object bounding box are not detected simultaneously, it is determined that the determination result of whether the predetermined distraction action occurs is that none of eating action, drinking action, calling action, entertainment action, and makeup action is detected; and/or, if the hand bounding box does not overlap the action interaction object bounding box, it is determined that the determination result of whether the predetermined distraction action occurs is that none of eating action, drinking action, calling action, entertainment action, and makeup action is detected; and/or, if the type of the action interaction object is a container or food, and the action interaction object bounding box does not overlap the mouth bounding box, and/or, the type of the action interaction object is an electronic device, and the minimum distance between the action interaction object bounding box and the mouth bounding box is not less than the first preset distance, or the minimum distance between the action interaction object bounding box and the eye bounding box is not less than the second preset distance, it is determined that the determination result of whether the predetermined distraction action occurs is that none of eating action, drinking action, calling action, entertainment action, and makeup action is detected.

In the foregoing examples, the eighth neural network and the ninth neural network may perform predetermined distraction action detection on the driver image and output the probabilities of various predetermined distraction actions. A distraction action that has a probability greater than a preset probability threshold and has the highest probability value may be selected as the detection result of the predetermined distraction action. If the probabilities of various predetermined distraction actions are lower than the preset probability threshold, it is considered that no predetermined distraction action is detected.

In addition, in the foregoing embodiments of performing predetermined distraction action detection on the driver image, the method may further include: if determining that a predetermined distraction action occurs, giving a prompt about the detected distraction action, for example, if a smoking action is detected, giving a prompt about the detection of smoking; if a drinking action is detected, giving a prompt about the detection of drinking; and if a calling action is detected, giving a prompt about the detection of calling, to prompt the driver to concentrate on driving.

In addition, in the foregoing embodiments of performing predetermined distraction action detection on the driver image, if determining that the predetermined distraction action occurs, the method may further include:

determining a distraction action level according to a distraction action level condition satisfied by the parameter value of the index for representing the distraction degree; and taking the determined distraction action level as the detection result of the predetermined distraction action.

In this embodiment, the detection result of the driver's predetermined distraction action may include: the predetermined distraction action does not occur (that is, the predetermined distraction action is not detected, which may also be referred to as a concentration driving level), and the predetermined distraction action occurs (that is, the predetermined distraction action is detected). In addition, the detection result of the driver's predetermined distraction action may also be a distraction action level, e.g., a distraction prompt level (also referred to as a mild distraction level) and a distraction warning level (also referred to as a severe distraction level). In addition, the distraction action level may also be divided into more levels, e.g., non-distraction level, mild distraction level, moderate distraction level, and severe distraction level. Certainly, the distraction action levels in the embodiments of the present disclosure may also be divided according to other situations, and are not limited to the foregoing level division.

The distraction action levels may be determined by means of the distraction action level condition satisfied by the parameter value of the index for representing the distraction degree. For example, the detection result of the predetermined distraction action of the driver is that no predetermined distraction action occurs; if it is determined that the predetermined distraction action occurs, and the duration of the predetermined distraction action is detected to be less than a first preset duration, and the frequency thereof is less than a first preset frequency, the distraction action level is the mild distraction level; and if it is detected that the duration of the predetermined distraction action is greater than the first preset duration, and/or the frequency is greater than the first preset frequency, the distraction action level is the severe distraction level.

In addition, in the embodiments of the present disclosure, the method may also include: performing alarm and/or intelligent driving control according to the state detection result of the driver. The state detection result of the driver includes any one or more of the following: a detection result of fatigue state, a detection result of distraction state, or a detection result of predetermined distraction action.

In some implementations, performing alarm and/or intelligent driving control according to the state detection result of the driver may include:

outputting prompt/warning information corresponding to a preset alarm condition when the state detection result of the driver satisfies the alarm condition; For example, the driver is prompted by sound (such as voice or ringing)/light (turning on a light or flashing a light)/vibration, etc., so as to prompt the driver to pay attention, and prompt the driver to return the distracted attention to driving, or encourage the driver to take a rest, etc. to achieve safe driving and avoid road traffic accidents; and/or, switching the driving mode to an automatic driving mode when the state detection result of the driver satisfies a predetermined driving mode switching condition, to achieve safe driving and avoid road traffic accidents.

In this embodiment, according to detection results of driver states, when a preset alarm condition is satisfied, prompt/alarm information corresponding to the alarm condition is output, and the driver is prompted to maintain a normal driving state for safe driving and avoid road traffic accidents. When a predetermined driving mode switching condition is satisfied, the driving mode is switched to an automatic driving mode, and the safe driving of the vehicle is implemented by means of the automatic driving mode to avoid road traffic accidents.

In some optional examples, outputting the prompt/warning information corresponding to the preset alarm condition when the state detection result of the driver satisfies the alarm condition may include:

outputting prompt/warning information corresponding to the detection result of fatigue state if the detection result of fatigue state is a fatigue state, where if the detection result of fatigue state of the driver is the fatigue state level, corresponding prompt or warning information is output according to the fatigue state level; and/or, outputting prompt/warning information corresponding to the detection result of distraction state if the detection result of distraction state is a distraction state, where if the detection result of distraction state of the driver is the distraction state level, corresponding prompt or warning information is output according to the fatigue state level; and/or, if the detection result of the predetermined distraction action is that the predetermined distraction action occurs, outputting prompt/warning information corresponding to the detection result of predetermined distraction action, where if the detection result of the predetermined distraction action is the distraction action level, corresponding prompt or warning information is output according to the distraction action level; and/or, outputting prompt/warning information in a preset mode when the detection results of fatigue state of the driver include any two or three of the fatigue state, the distraction state, and the detection of the predetermined distraction action. For example:

when the state detection result of the driver includes the fatigue state and the distraction state, the prompt/warning information corresponding to the detection result of fatigue state is output, or the prompt/warning information corresponding to the detection result of distraction state is output, or the prompt/warning information corresponding to the detection result of fatigue state and the detection result of distraction state is output; and/or, when the state detection result of the driver includes the distraction state and the occurrence of the predetermined distraction action, the prompt/warning information corresponding to the detection result of distraction state is output, or the prompt/warning information corresponding to the detection result of predetermined distraction action is output, or the prompt/warning information corresponding to the detection result of distraction state and the detection result of predetermined distraction action is output; and/or, when the state detection result of the driver includes the fatigue state and the detection of the predetermined distraction action, the prompt/warning information corresponding to the detection result of fatigue state is output, or the prompt/warning information corresponding to the detection result of predetermined distraction action is output, or the prompt/warning information corresponding to the detection result of fatigue state and the detection result of predetermined distraction action is output; and/or, when the state detection result of the driver includes the fatigue state, the distraction state, and the detection of the predetermined distraction action, the prompt/warning information corresponding to the detection result of fatigue state is output, or the prompt/warning information corresponding to the detection result of distraction state is output, or the prompt/warning information corresponding to the detection result of predetermined distraction action is output, or the prompt/warning information corresponding to the detection result of fatigue state and the detection result of distraction state is output, or the prompt/warning information corresponding to the detection result of distraction state and the detection result of predetermined distraction action is output, or the prompt/warning information corresponding to the detection result of fatigue state and the detection result of predetermined distraction action is output, or the prompt/warning information corresponding to the detection result of fatigue state, the detection result of distraction state, and the detection result of predetermined distraction action is output. For example, based on the foregoing embodiments, outputting the prompt/warning information corresponding to the detection result of fatigue state if the detection result of fatigue state is the fatigue state may include the following.

If it is found, based on the head location information, that the driver is doing a nap nodding action, it is determined that the detection result of fatigue state of the driver is the fatigue state, and fatigue prompt information is output. If the driver keeps doing nap nodding actions, the driver's fatigue degree continues to deepen (that is, the fatigue state level is increased), where the fatigue degrees are the mild fatigue level, the moderate fatigue level, and the severe fatigue level sequentially, and the fatigue alarm information is output every X seconds, until the detection result of fatigue state of the driver is a non-fatigue state, that is, the driver resumes a normal driving state, where X is a value greater than 0.

If it is found, based on the eye state information, that the duration of eye closure of the driver reaches a certain duration or the blink frequency reaches a certain value, it is determined that the detection result of fatigue state of the driver is the fatigue state, and fatigue prompt information is output. If the duration of eye closure of the driver increases continuously or the blink frequency is always too high, the driver's fatigue degree continues to deepen (that is, the fatigue state level is increased), where the fatigue degrees are the mild fatigue level, the moderate fatigue level, and the severe fatigue level sequentially, and the fatigue alarm information is output every X seconds, until the detection result of fatigue state of the driver is a non-fatigue state, that is, the driver resumes a normal driving state.

Based on the mouth state information, if it is found that the driver is doing a yawn action, it is determined that the detection result of fatigue state of the driver is the fatigue state, and fatigue prompt information is output. If the driver keeps doing yawn actions, the driver's fatigue degree continues to deepen (that is, the fatigue state level is increased), and the fatigue degrees are the mild fatigue level, the moderate fatigue level, and the severe fatigue level sequentially, and the fatigue alarm information is output every X seconds, until the detection result of fatigue state of the driver is a non-fatigue state, that is, the driver resumes a normal driving state.

Based on the head location information, the eye state information, and the mouth state information, if the driver is found to be in two or more states of four behaviors, i.e., napping and nodding, the duration of eye closure reaches a certain period of time, the blink frequency reaches a certain value, yawning, etc., it is determined that the driver is in a severe fatigue level, and the fatigue alarm information is output every X seconds until the detection result of fatigue state of the driver is a non-fatigue state, that is, the driver resumes a normal driving state. For example, based on the foregoing embodiments, outputting the prompt/warning information corresponding to the detection result of distraction state if the detection result of distraction state is the distraction state may include the following.

It is determined that detection result of distraction state of the driver is the distraction state based on the head location information if the deviation angle of the head location of the driver exceeds a preset range and the deviation time exceeds Y seconds, and distraction prompt information is output. As the deviation time that the deviation degree of the head location of the driver exceeds the preset range continues to increase, the distraction degree of the driver continues to deepen (that is, the distraction state level is increased), where the distraction degrees are sequentially that the driver's attention is slightly distracted, and the driver's attention is moderately distracted, the driver's attention is severely distracted and the like, and the distraction alarm information is output every X seconds until the detection result of distraction state of the driver is a non-distraction state, that is, the driver resumes a normal driving state;

Based on the head location information and the gaze direction information, if the deviation angle of the head location of the driver does not exceed the preset range, but the gaze direction deviation angle exceeds a preset gaze safety range, and the duration exceeds Y seconds, it is determined that the detection result of distraction state of the driver is the distraction state, and distraction prompt information is output. As the duration that the gaze direction deviation angle exceeds the preset gaze safety range increases, the distraction degree of the driver continues to deepen (that is, the distraction state level is increased), where the distraction degrees are sequentially that the driver's attention is slightly distracted, and the driver's attention is moderately distracted, the driver's attention is severely distracted and the like, and the distraction alarm information is output every X seconds until the detection result of distraction state of the driver is a non-distraction state, that is, the driver resumes a normal driving state.

Based on the head location information, the gaze direction information, and the eye open/closed state information, if the deviation angle of the head location of the driver does not exceed the preset range, and the gaze direction deviation angle does not exceed the preset gaze safety range, but it is detected that the driver is in a daze state, it is determined that the detection result of distraction state of the driver is the distraction state, and distraction prompt information is output. The distraction degree of the driver continues to deepen (that is, the distraction state level is increased), where the distraction degrees are sequentially that the driver's attention is slightly distracted, and the driver's attention is moderately distracted, the driver's attention is severely distracted and the like, and the distraction alarm information is output every X seconds until the detection result of distraction state of the driver is a non-distraction state, that is, the driver resumes a normal driving state.

Optionally, in the foregoing embodiments, the method further includes:

suppressing the prompt/warning information corresponding to other detection results in the state detection result of the driver (for example, prompt/warning information corresponding to a distraction state, and prompt/warning information corresponding to the detection result of a predetermined distraction action) within a preset period of time after outputting the prompt/warning information corresponding to the fatigue state; and/or, suppressing the prompt/warning information corresponding to other detection results in the state detection result of the driver (for example, prompt/warning information corresponding to a fatigue state, and prompt/warning information corresponding to the detection result of a predetermined distraction action) within a preset period of time after outputting the prompt/warning information corresponding to the distraction state; and/or, suppressing the prompt/warning information corresponding to other detection results in the state detection result of the driver (for example, prompt/warning information corresponding to a distraction state, and prompt/warning information corresponding to a fatigue state) within a preset period of time after outputting the prompt/warning information corresponding to the detection result of the predetermined distraction action.

In the foregoing embodiments, prompt/warning information corresponding to other detection results is suppressed within a preset period of time after outputting prompt/warning information of one driver state, that is, the purpose of prompting the driver to drive safely can be achieved, and repeatedly outputting a variety of prompt/warning information to interfere with the normal driving of the driver can also be avoided, thereby improving driving safety.

In some implementations, switching the driving mode to the automatic driving mode when the state detection result of the driver satisfy a predetermined driving mode switching condition includes: switching the driving mode to the automatic driving mode when the fatigue state level and/or the distraction state level and/or the distraction action level satisfies the predetermined driving mode switching condition.

In addition, in the embodiments of the present disclosure, after determining the state detection result of the driver, the state detection result of the driver may also be output, for example, outputting the state detection result of the driver locally and/or outputting the state detection result of the driver remotely. Outputting the state detection result of the driver locally is to output the state detection result of the driver by a driver state detection apparatus or a driver monitoring system, or output the state detection result of the driver to a central control system in the vehicle, so that intelligent driving control is performed on the vehicle based on the state detection result of the driver. Outputting the state detection result of the driver remotely may be, for example, sending the state detection result of the driver to a cloud server or a management node, so that the cloud server or the management node collects, analyzes, and/or manages the state detection result of the driver, or the vehicle is remotely controlled based on the state detection result of the driver.

Furthermore, in the foregoing embodiments, the state detection result of the driver may also be stored in user information of the driver in a database, and the driving state detection result of the driver is recorded to facilitate subsequent query of the driving state detection result of the driver, or analysis and statistical collection about the driving behavior habits of the driver.

In addition, in another embodiment of the driving state detection method of the present disclosure, the method further includes: performing image acquisition by means of an infrared camera, for example, performing image acquisition by means of an infrared camera deployed in at least one location within the vehicle to obtain the driver image.

The driver image in the embodiments of the present disclosure is generally an image frame in a video captured by an infrared camera (including a near-infrared camera and the like) from a cab.

The wavelength of the infrared camera may be 940 nm or 850 nm. The infrared camera may be provided in any location where the driver may be photographed in the cab of the vehicle, for example, the infrared camera may be deployed in any one or more of the following locations: a location above or near a dashboard, a location above or near a center console, an A-pillar or nearby location, or a rearview mirror or nearby location. For example, in some optional examples, the infrared camera may be provided in a location above the dashboard (such as the location right above) and facing directly forward, may be provided in a location above the center console (for example, in the middle location) and facing directly forward, may also be provided on the A-pillar (for example, it may be attached to glass close to the A-pillar) and facing the face of the driver, and may also be provided on the rearview mirror (for example, it may be attached to glass above the rearview mirror) and facing the face of the driver. When the infrared camera is provided in a location above the dashboard and above the center console, the specific location thereof is determined according to the view of the camera and the location of the driver, for example, when it is provided in the location above the dashboard, the infrared camera may face the driver to ensure that the camera view is not blocked by the steering wheel; when it is provided in the location above the center console, if the view of the camera is large enough, the infrared camera may be aimed at the rear to ensure that the driver is in the field of view of the camera, and if the view is not large enough, the infrared camera may face the driver to ensure that the driver appears in the view of the infrared camera.

Since light in a region where a driver is located (such as, in the vehicle or in the cab) is often complicated, the quality of a driver image captured by an infrared camera tends to be better than the quality of a driver image captured by an ordinary camera, especially at night or in a dark environment such as a cloudy sky or a tunnel, the quality of a driver image captured by an infrared camera is usually significantly better than the quality of a driver image captured by an ordinary camera, which is beneficial to improve the accuracy of distraction state detection and distraction action detection of a driver, so as to improve the accuracy of driving state monitoring.

In the embodiments of the present disclosure, an easy-to-deploy and easy-to-use infrared camera is used to obtain a driver image in real time. The camera may be installed in various locations, for example, on the center console, dashboard, A-pillar, interior rearview mirror, etc. of the vehicle. By using a neural network based on deep learning technology to implement fatigue state detection and distraction state detection of the driver, the robustness is good, the application range is wide, and a better driving state detection effect can be achieved in day, night, strong light, low light and other scenarios.

Optionally, in practical applications, an original image captured by a camera often cannot be directly used due to various restrictions and random interference. In some optional examples of the present disclosure, gray-scale pre-processing may be performed on the driver image captured by the infrared camera, and a red, green and blue (RGB) 3-channel image is converted into a gray-scale image, and then operations such as identity authentication, distraction state detection and distraction action detection of the driver are performed to improve the accuracy of identity authentication, distraction state detection and distraction action detection.

In some implementations, image acquisition is performed by an infrared camera to obtain a driver image in, for example, the following scenarios:

performing image acquisition by means of the infrared camera when the vehicle is in a driving state, to obtain the driver image; and/or, performing image acquisition by means of the infrared camera when a running speed of the vehicle exceeds a preset speed, to obtain the driver image; and/or, performing image acquisition by means of the infrared camera after detecting that the vehicle is powered on, to obtain the driver image; and/or, performing image acquisition by means of the infrared camera when a start instruction for the vehicle is detected, to obtain the driver image; and/or, performing image acquisition by means of the infrared camera when a control instruction (for example, accelerating, speeding up, steering, opening or closing a window, turning on or off an air conditioner, turning on or off an entertainment system, or the like) to the vehicle or a component or system in the vehicle is detected, to obtain the driver image.

In some of the application scenarios, when the driver starts the vehicle and starts a driving state monitoring apparatus or a driver monitoring system, an infrared camera is started to acquire a driver image for driving state detection.

In the driving state detection method in the foregoing embodiments of the present disclosure, image acquisition may be performed by an infrared (including near-infrared) camera to obtain a driver image, and then the driver image is sent to an electronic device such as a single chip microcomputer, FPGA, ARM, a Central Processing Unit (CPU), a Graphic Processing Unit (GPU), a microprocessor, a smart mobile phone, a notebook computer, a tablet computer (PAD), a desktop computer, or a server which can load a neural network for implementation. The electronic device can run a computer program (also called a program code), which may be stored in a computer-readable storage medium such as a flash memory, a cache, a hard disk, or an optical disk.

Any driving state detection method provided by the embodiments of the present disclosure may be performed by any appropriate device with a data processing capability, including, but not limited to, a terminal device, a server, and the like. Alternatively, any driving state detection method provided in the embodiments of the present disclosure is performed by a processor, for example, any driving state detection method mentioned in the embodiments of the present disclosure is performed by the processor by invoking corresponding instructions stored in a memory. Details are not described below again.

A person of ordinary skill in the art may understand that all or some steps for implementing the foregoing method embodiments are achieved by a program by instructing related hardware; the foregoing program may be stored in a computer-readable storage medium; when the program is executed, steps including the foregoing method embodiments are performed. Moreover, the foregoing storage medium includes various media capable of storing program codes, such as a Read-Only Memory (ROM), a Random Access Memory (RAM), a magnetic disk, or an optical disk.

Figure 4:
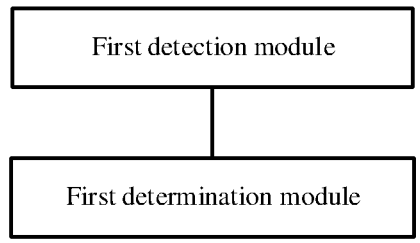
FIG. 4 is a schematic structural diagram of one embodiment of a driving state detection apparatus according to the present disclosure.

FIG. 4 is a schematic structural diagram of one embodiment of a driving state detection apparatus according to the present disclosure. The driving state detection apparatus of this embodiment may be configured to implement the foregoing driving state detection method embodiments of the present disclosure. As shown in FIG. 4, the driving state detection apparatus of this embodiment includes: a first detection module, configured to perform head pose detection and eye state detection on a driver image to obtain head pose information and eye state information; and a first determination module, configured to determine detection results of fatigue state and distraction state of a driver according to the head pose information and the eye state information.

Based on the driving state detection apparatus provided in the foregoing embodiments of the present disclosure, head pose detection and eye state detection may be performed on a driver image, and detection results of fatigue state and distraction state of a driver are determined according to detected head pose information and eye state information. In the embodiments of the present disclosure, by performing head pose detection and eye state detection on a driver image, a joint and real-time detection of the fatigue state and distraction state of a driver is implemented, so that corresponding measures are taken in time when the driver's driving state is poor, thereby improving the driving safety and reducing the occurrence of road traffic accidents.

Figure 5:
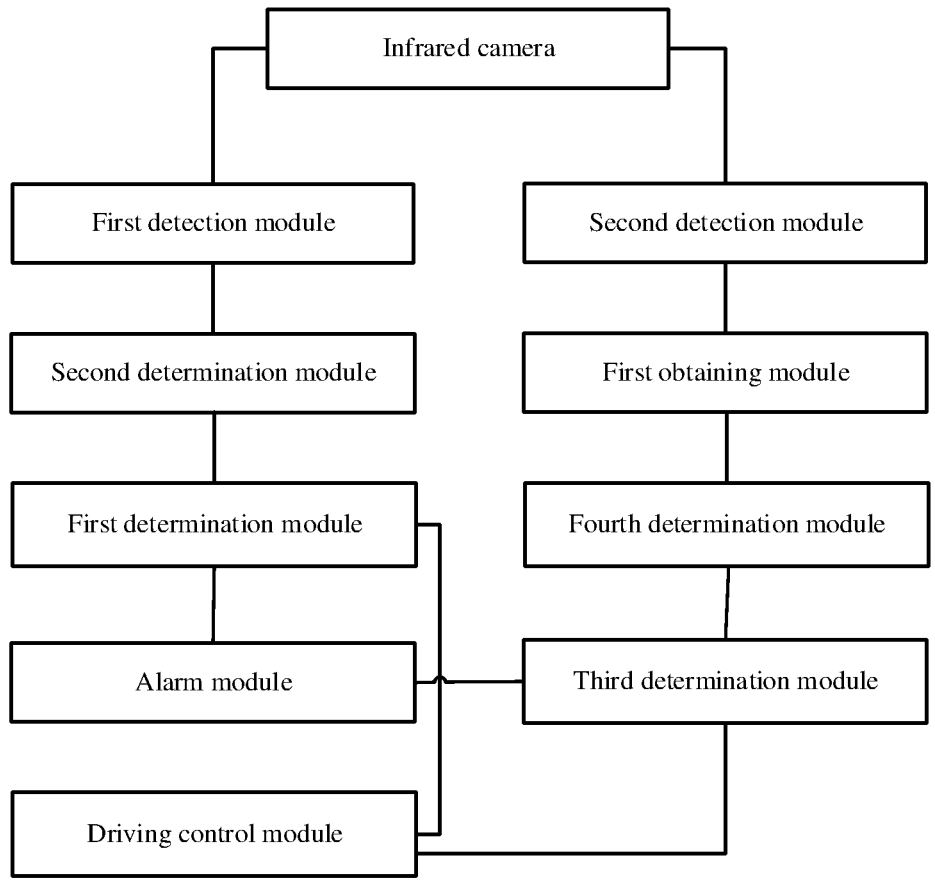
FIG. 5 is a schematic structural diagram of another embodiment of a driving state detection apparatus according to the present disclosure.

FIG. 5 is a schematic structural diagram of another embodiment of a driving state detection apparatus according to the present disclosure. As shown in FIG. 5, compared with the embodiment illustrated in FIG. 4, the driving state detection apparatus of this embodiment further includes: a second determination module, configured to determine whether a deviation angle of a head location of the driver exceeds a preset range according to head location information of the driver in the driver image determined based on the head pose information.

Accordingly, in this embodiment, the first determination module includes: a first determination unit, configured to determine, if the deviation angle of the head location of the driver exceeds the preset range, a detection result of distraction state of the driver according to the head pose information and the eye state information; and/or a second determination unit, configured to determine, if the deviation angle of the head location of the driver does not exceed the preset range, the detection results of fatigue state and distraction state of the driver according to the head pose information and the eye state information.

In some implementations, the first determination unit includes: a first determination subunit, configured to determine a parameter value of an index for representing the distraction state of the driver according to the head pose information and the eye state information; and a second determination subunit, configured to determine the detection result of distraction state of the driver according to the parameter value of the index for representing the distraction state of the driver.

In some implementations, the second determination unit includes: a third determination subunit, configured to determine a parameter value of an index for representing the fatigue state of the driver according to the head pose information and the eye state information; a first determination subunit, configured to determine a parameter value of an index for representing the distraction state of the driver according to the head pose information and the eye state information; a fourth determination subunit, configured to determine the detection result of fatigue state of the driver according to the parameter value of the index for representing the fatigue state of the driver; and a second determination subunit, configured to determine the detection result of distraction state of the driver according to the parameter value of the index for representing the distraction state of the driver.

In some implementations, the first detection module includes: a key point detection unit, configured to perform face key point detection on the driver image; and a first obtaining unit, configured to obtain the head pose information and the eye state information according to detected face key points.

When obtaining the head pose information according to the detected face key points, the first obtaining unit is configured to obtain the head pose information by means of a first neural network based on the face key points.

For example, in some optional examples, when obtaining the eye state information according to the detected face key points, the first obtaining unit is configured to determine an eye region image in the driver image according to the face key points; perform detections of an upper eyelid line and a lower eyelid line on the eye region image based on a second neural network; and determine eye open/closed state information of the driver according to a spacing between the upper eyelid line and the lower eyelid line, where the eye state information includes the eye open/closed state information.

In some other optional examples, when obtaining the eye state information according to the detected face key points, the first obtaining unit is configured to determine an eye region image in the driver image according to the face key points; and perform eye open/closed classification processing on the eye region image based on a third neural network, to obtain an eye open classification result or an eye closed classification result, where the eye state information includes an eye open state or an eye closed state.

In addition, in the foregoing driving state detection apparatus embodiments, the first detection module is further configured to perform mouth state detection on the driver image to obtain mouth state information. Accordingly, in this embodiment, the third determination subunit is configured to determine the parameter value of the index for representing the fatigue state of the driver according to the head pose information, the eye state information, and the mouth state information. Optionally, the first obtaining unit in the first detection module is further configured to obtain the mouth state information according to the detected face key points.

In some optional examples, when obtaining the mouth state information according to the detected face key points, the first obtaining unit is configured to determine a mouth region image in the driver image according to the face key points; perform detections of an upper lip line and a lower lip line on the mouth region image based on a fourth neural network; and determine mouth open/closed state information of the driver according to a spacing between the upper lip line and the lower lip line, where the mouth state information includes the mouth open/closed state information.

In some other optional examples, when obtaining the mouth state information according to the detected face key points, the first obtaining unit is configured to determine a mouth region image in the driver image according to the face key points; and perform mouth open/closed classification processing on the mouth region image based on a fifth neural network, to obtain a mouth open classification result or a mouth closed classification result, where the mouth state information includes a mouth open state or a mouth closed state.

In some optional examples, the first determination subunit is configured to: determine the head location of the driver in the driver image according to the head pose information to obtain head location information, and obtain a parameter value of a head location deviation degree according to the head location information within a period of time; and/or, determine face orientation of the driver in the driver image according to the head pose information to obtain face orientation information, and obtain a parameter value of a face orientation deviation degree according to the face orientation information within a period of time; and/or, determine a gaze direction of the driver in the driver image according to the head pose information to obtain gaze direction information, and obtain a parameter value of a gaze direction deviation degree according to the gaze direction information within a period of time; or determine an eye region image in the driver image according to the face key points, obtain gaze direction information of the driver in the eye region image based on a sixth neural network, and obtain a parameter value of a gaze direction deviation degree according to the gaze direction information within a period of time; and/or, obtain a parameter value of a daze degree according to the eye state information within a period of time.

In some optional examples, the third determination subunit is configured to: determine the head location of the driver in the driver image according to the head pose information to obtain head location information, and obtain a parameter value of a nap degree according to the head location information within a period of time; and/or, obtain a parameter value of an eye closure degree according to the eye state information within a period of time; and/or, obtain a parameter value of a blink degree according to the eye state information within a period of time; and/or, obtain a parameter value of a yawning degree according to the mouth state information within a period of time.

The index for representing the fatigue state of the driver includes any one or more of the following: a nap degree, an eye closure degree, a blink degree, a yawning degree, etc.; and/or, the index for representing the distraction state of the driver includes any one or more of the following: a head location deviation degree, a face orientation deviation degree, a gaze direction deviation degree, a daze degree, etc.

In some optional examples, when determining the head location of the driver in the driver image according to the head pose information, the first determination subunit is configured to obtain a pitch angle in the head pose information as the head location; and/or, when determining the face orientation of the driver in the driver image according to the head pose information, the first determination subunit is configured to obtain the pitch angle and a yaw angle in the head pose information as the face orientation.

In some optional examples, when determining the gaze direction of the driver in the driver image according to the head pose information to obtain the gaze direction information, the first determination subunit is configured to determine a pupil edge location according to an eye image positioned by an eye key point in the face key points, and compute a pupil center location according to the pupil edge location; obtain eyeball rotation angle information in a head pose corresponding to the head pose information according to the pupil center location and an eye center location; and determine the gaze direction of the driver according to the head pose information and the eyeball rotation angle information to obtain the gaze direction information. For example, when determining the pupil edge location according to the eye image positioned by the eye key point in the face key points, the first determination subunit is configured to perform pupil edge location detection on the eye region image in the image divided according to the face key points based on a seventh neural network, and obtain the pupil edge location according to information output by the seventh neural network.

In some optional examples, when obtaining the parameter value of the gaze direction deviation degree according to the gaze direction information within the period of time, the first determination subunit is configured to obtain the parameter value of the gaze direction deviation degree according to a deviation angle of the gaze direction information with respect to a reference gaze direction within the period of time. The reference gaze direction is preset, or the reference gaze direction is an average gaze direction determined based on the first N driver image frames in a video where the driver image is located, where N is an integer greater than 1.

In some optional examples, when obtaining the parameter value of the daze degree according to the eye state information within the period of time, the first determination subunit is configured to determine, according to the eye state information, that the driver is in a daze state when the eyes of the driver are in an eye open state for a preset period of daze time; and obtain the parameter value of the daze degree according to the eye state information within the period of time, where the period of time includes the preset period of daze time.

In some optional examples, when obtaining the parameter value of the nap degree according to the head location information within the period of time, the third determination subunit is configured to determine, according to the head location information, that the driver is in a nap state when the head location of the driver has a deviation degree with respect to a preset reference head location reaching a preset deviation range within a first preset period of time and returns to the preset reference head location within a second preset period of time; and obtain the parameter value of the nap degree according to the head location information within the period of time, where the period of time includes the first preset period of time and the second preset period of time.

In some optional examples, when obtaining the parameter value of the yawning degree according to the mouth state information within the period of time, the third determination subunit is configured to determine, according to the mouth state information, that the driver completes a yawn action when the time that the mouth of the driver changes from a mouth closed state to a mouth open state and then returns to the mouth closed state is within a preset time range; and obtain the parameter value of the yawning degree according to the mouth state information within the period of time, where the period of time includes the time that the mouth of the driver changes from the mouth closed state to the mouth open state and then returns to the mouth closed state.

In some optional examples, the parameter value of the head location deviation degree includes any one or more of the following: a head location deviation state, a head location deviation direction, a deviation angle of the head location in the head location deviation direction, a head location deviation duration, or a head location deviation frequency; and/or, the parameter value of the face orientation deviation degree includes any one or more of the following: the number of head turns, a head turn duration, or a head turn frequency; and/or, the parameter value of the gaze direction deviation degree includes any one or more of the following: a gaze direction deviation angle, a gaze direction deviation duration, or a gaze direction deviation frequency; and/or, the parameter value of the daze degree includes any one or more of the following: an eye open amplitude, an eye open duration, or a ratio of an eye open cumulative duration to a statistical time window; and/or, the parameter value for representing the nap degree includes any one or more of the following: a nap nodding state, a nap nodding amplitude, the number of nap nods, a nap nodding frequency, or a nap nodding duration; and/or, the parameter value for representing the eye closure degree includes any one or more of the following: the number of eye closures, an eye closure frequency, an eye closure duration, an eye closure amplitude, the number of eye semi-closures, an eye semi-closure frequency, or a ratio of an eye closure cumulative duration to the statistical time window; and/or, the parameter value for representing the blink degree includes any one or more of the following: the number of blinks, a blink frequency, a blink duration, or a ratio of a blink cumulative duration to the statistical time window; and/or, the parameter value for representing the yawning degree includes any one or more of the following: a yawning state, the number of yawns, a yawn duration, or a yawning frequency.

In some optional examples, the second determination subunit is configured to determine that the detection result of distraction state of the driver is a distraction state when any one or more of the parameter values of the indexes for representing the distraction state of the driver satisfy a predetermined distraction condition; and/or, determine that the detection result of distraction state of the driver is a non-distraction state when all the parameter values of the indexes for representing the distraction state of the driver do not satisfy the predetermined distraction condition.

In some optional examples, the predetermined distraction condition includes multiple distraction level conditions. Accordingly, in this embodiment, when determining that the detection result of distraction state of the driver is the distraction state when any one or more of the parameter values of the indexes for representing the distraction state of the driver satisfy the predetermined distraction condition, the second determination subunit is configured to determine a distraction state level according to a distraction level condition satisfied by the parameter value of the index for representing the distraction state of the driver; and take the determined distraction state level as the detection result of distraction state of the driver.

In some optional examples, the fourth determination subunit is configured to determine that the detection result of fatigue state of the driver is a fatigue state when any one or more of the parameter values of the indexes for representing the fatigue state of the driver satisfy a predetermined fatigue condition; and/or, determine that the detection result of fatigue state of the driver is a non-fatigue state when all the parameter values of the indexes for representing the fatigue state of the driver do not satisfy the predetermined fatigue condition.

In some optional examples, the predetermined fatigue condition includes multiple fatigue level conditions. Accordingly, in this embodiment, when determining that the detection result of fatigue state of the driver is the fatigue state when any one or more of the parameter values of the indexes for representing the fatigue state of the driver satisfy the predetermined fatigue condition, the fourth determination subunit is configured to determine a fatigue state level according to a fatigue level condition satisfied by the parameter value of the index for representing the fatigue state of the driver; and take the determined fatigue state level as the detection result of fatigue state of the driver.

In addition, referring again to FIG. 5, in another embodiment of the driving state detection apparatus of the present disclosure, the apparatus further includes: a second detection module, configured to perform predetermined distraction action detection on the driver image to determine whether a predetermined distraction action occurs; a first obtaining module, configured to obtain, if the predetermined distraction action occurs, a parameter value of an index for representing a distraction degree of the driver according to a determination result of whether the predetermined distraction action occurs within a period of time; and a third determination module, configured to determine a detection result of the predetermined distraction action of the driver according to the parameter value of the index for representing the distraction degree of the driver. The parameter value of the distraction degree includes any one or more of the following: the number of occurrences of the predetermined distraction action, a duration of the predetermined distraction action, a frequency of the predetermined distraction action, and the like. The predetermined distraction action includes any one or more of the following: a smoking action, a drinking action, an eating action, a calling action, an entertainment action, a makeup action, and the like.

In some implementations, the second detection module is configured to extract a feature of the driver image; extract multiple candidate boxes that may include the predetermined distraction action based on the feature; determine an action target box based on the multiple candidate boxes, where the action target box includes a local region of a face and an action interaction object, or further includes a hand region; and perform classification detection of the predetermined distraction action based on the action target box to determine whether the predetermined distraction action occurs. The local region of the face includes any one or more of the following: a mouth region, an ear region, or an eye region; and/or, the action interaction object includes any one or more of the following: a container, a cigarette, a mobile phone, food, a tool, a beverage bottle, eyeglasses, or a mask.

In some implementations, the second detection module is configured to perform face detection on the driver image by means of an eighth neural network to obtain a face bounding box, and extract feature information of the face bounding box; and determine whether a smoking action occurs by means of the eighth neural network according to the feature information of the face bounding box.

In some implementations, the second detection module is configured to perform preset target object detection corresponding to an eating action/drinking action/calling action/ entertainment action/makeup action on the driver image by means of a ninth neural network to obtain a bounding box of a preset target object, where the preset target object includes hands, mouth, eyes, and the action interaction object, and the action interaction object includes any one or more types of the following: a container, food, an electronic device, or cosmetics; and determine whether the predetermined distraction action occurs according to the bounding box of the preset target object, where the determination result of whether the predetermined distraction action occurs includes one of the following: no eating action/drinking action/calling action/entertainment action/makeup action occurs; an eating action occurs; a drinking action occurs; a calling action occurs; an entertainment action occurs; or a makeup action occurs.

In some implementations, when determining whether the predetermined distraction action occurs according to the bounding box of the preset target object, the second detection module is configured to determine whether the predetermined distraction action occurs according to whether a hand bounding box, a mouth bounding box, an eye bounding box, and an action interaction object bounding box are detected, whether the hand bounding box overlaps the action interaction object bounding box, the type of the action interaction object, and whether the distance between the action interaction object bounding box and the mouth bounding box or the eye bounding box satisfies a preset condition.

In some implementations, when determining whether the predetermined distraction action occurs according to whether the hand bounding box overlaps the action interaction object bounding box, and whether the location relationship between the action interaction object bounding box and the mouth bounding box or the eye bounding box satisfies a preset condition, the second detection module is configured to: determine, if the hand bounding box overlaps the action interaction object bounding box, the type of the action interaction object is a container or food, and the action interaction object bounding box overlaps the mouth bounding box, that an eating action or a drinking action occurs; and/or determine, if the hand bounding box overlaps the action interaction object bounding box, the type of the action interaction object is an electronic device, and the minimum distance between the action interaction object bounding box and the mouth bounding box is less than a first preset distance, or the minimum distance between the action interaction object bounding box and the eye bounding box is less than a second preset distance, that an entertainment action or a calling action occurs.

In some implementations, the second detection module is further configured to: if the hand bounding box, the mouth bounding box, and any action interaction object bounding box are not detected simultaneously, and the hand bounding box, the eye bounding box, and any action interaction object bounding box are not detected simultaneously, determine that the determination result of whether the predetermined distraction action occurs is that none of eating action, drinking action, calling action, entertainment action, and makeup action is detected; and/or, if the hand bounding box does not overlap the action interaction object bounding box, determine that the determination result of whether the predetermined distraction action occurs is that none of eating action, drinking action, calling action, entertainment action, and makeup action is detected; and/or, if the type of the action interaction object is a container or food, and the action interaction object bounding box does not overlap the mouth bounding box, and/or, the type of the action interaction object is an electronic device, and the minimum distance between the action interaction object bounding box and the mouth bounding box is not less than the first preset distance, or the minimum distance between the action interaction object bounding box and the eye bounding box is not less than the second preset distance, determine that the determination result of whether the predetermined distraction action occurs is that none of eating action, drinking action, calling action, entertainment action, and makeup action is detected.

In addition, referring again to FIG. 5, in yet another embodiment of the driving state detection apparatus of the present disclosure, the apparatus further includes: a fourth determination module, configured to determine a distraction action level according to a distraction action level condition satisfied by the parameter value of the index for representing the distraction degree. Accordingly, in this embodiment, the third determination module is configured to take the determined distraction action level as the detection result of the predetermined distraction action of the driver.

In addition, referring again to FIG. 5, in yet another embodiment of the driving state detection apparatus of the present disclosure, the apparatus further includes: an alarm module, configured to perform alarm according to the state detection result of the driver; and/or, a driving control module, configured to perform intelligent driving control according to the state detection result of the driver. The state detection result of the driver includes any one or more of the following: a detection result of fatigue state, a detection result of distraction state, or a detection result of predetermined distraction action.

In some implementations, the alarm module is configured to output prompt/warning information corresponding to a preset alarm condition when the state detection result of the driver satisfies the alarm condition; and/or, the driving control module is configured to switch the driving mode to an automatic driving mode when the state detection result of the driver satisfies a predetermined driving mode switching condition.

In some optional examples, the alarm module is configured to output prompt/warning information corresponding to the detection result of fatigue state if the detection result of fatigue state is a fatigue state; and/or, output prompt/warning information corresponding to the detection result of distraction state if the detection result of distraction state is a distraction state; and/or, if the predetermined distraction action occurs, output prompt/warning information corresponding to the detection result of predetermined distraction action; and/or, output prompt/warning information in a preset mode when the state detection result of the driver includes any two or three of the fatigue state, the distraction state, and the occurrence of the predetermined distraction action.

In some optional examples, the alarm module is further configured to: suppress the prompt/warning information corresponding to other detection results in the state detection result of the driver within a preset period of time after the alarm module outputs the prompt/warning information corresponding to the fatigue state; and/or, suppress the prompt/warning information corresponding to other detection results in the state detection result of the driver within a preset period of time after outputting the prompt/warning information corresponding to the distraction state; and/or, suppress the prompt/warning information corresponding to other detection results in the state detection result of the driver within a preset period of time after outputting the prompt/warning information corresponding to the detection result of predetermined distraction action.

In some optional examples, when outputting the prompt/warning information in the preset mode when the state detection result of the driver includes any two or three of the fatigue state, the distraction state, and the occurrence of the predetermined distraction action, the alarm module is configured to: when the state detection result of the driver includes the fatigue state and the distraction state, output the prompt/warning information corresponding to the detection result of fatigue state, or output the prompt/warning information corresponding to the detection result of distraction state, or output the prompt/warning information corresponding to the detection result of fatigue state and the detection result of distraction state; and/or, when the state detection result of the driver includes the distraction state and detection of the predetermined distraction action, output the prompt/warning information corresponding to the detection result of distraction state, or output the prompt/warning information corresponding to the detection result of predetermined distraction action, or output the prompt/warning information corresponding to the detection result of distraction state and the detection result of predetermined distraction action; and/or, when the state detection result of the driver includes the fatigue state and detection of the predetermined distraction action, output the prompt/warning information corresponding to the detection result of fatigue state, or output the prompt/warning information corresponding to the detection result of the predetermined distraction action being detected, or output the prompt/warning information corresponding to the detection result of fatigue state and the detection result of predetermined distraction action; and/or, when the state detection result of the driver includes the fatigue state, the distraction state, and the occurrence of the predetermined distraction action, output the prompt/warning information corresponding to the detection result of fatigue state, or output the prompt/warning information corresponding to the detection result of distraction state, or output the prompt/warning information corresponding to the detection result of predetermined distraction action, or output the prompt/warning information corresponding to the detection result of fatigue state and the detection result of distraction state, or output the prompt/warning information corresponding to the detection result of distraction state and the detection result of predetermined distraction action, or output the prompt/warning information corresponding to the detection result of fatigue state and the detection result of predetermined distraction action, or output the prompt/warning information corresponding to the detection result of fatigue state, the detection result of distraction state, and the detection result of predetermined distraction action.

In some optional examples, when outputting the prompt/warning information corresponding to the detection result of fatigue state if the detection result of fatigue state is the fatigue state level, the alarm module is configured to output corresponding prompt or warning information according to the fatigue state level; and/or, when outputting the prompt/warning information corresponding to the detection result of distraction state if the detection result of distraction state is the distraction state level, the alarm module is configured to output corresponding prompt or warning information according to the distraction state level; and when outputting the prompt/warning information corresponding to the detection result of predetermined distraction action if the detection result of predetermined distraction action is the distraction action level, the alarm module is configured to output corresponding prompt or warning information according to the distraction action level.

In some optional examples, the driving control module is configured to switch the driving mode to the automatic driving mode when the fatigue state level and/or the distraction state level and/or the distraction action level satisfies the predetermined driving mode switching condition.

In addition, referring again to FIG. 5, in the foregoing embodiments of the present disclosure, the apparatus further includes: an infrared camera, configured to perform image acquisition to obtain the driver image. The infrared camera is deployed in at least one location in a vehicle, for example, any one or more of the following locations: a location above or near a dashboard, a location above or near a center console, an A-pillar or nearby location, or a rearview mirror or nearby location.

In some implementations, the infrared camera is configured to: perform image acquisition when the vehicle is in a driving state, to obtain the driver image; and/or, perform image acquisition when a running speed of the vehicle exceeds a preset speed, to obtain the driver image; and/or, perform image acquisition after detecting that the vehicle is powered on, to obtain the driver image; and/or, perform image acquisition when a start instruction for the vehicle is detected, to obtain the driver image; and/or, perform image acquisition when a control instruction to the vehicle or a component or system in the vehicle is detected, to obtain the driver image.

Figure 6:
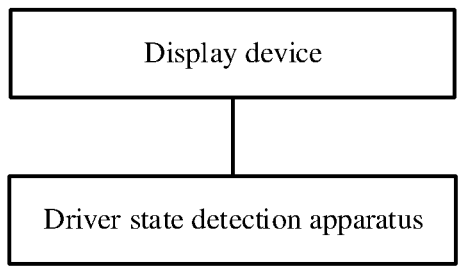
FIG. 6 is a schematic structural diagram of one embodiment of a driver monitoring system according to the present disclosure.

FIG. 6 is a schematic structural diagram of one embodiment of a driver monitoring system according to the present disclosure. The driver monitoring system of this embodiment may be configured to implement the foregoing driving state detection method embodiments of the present disclosure. As shown in FIG. 6, the driver monitoring system of this embodiment includes: a display device, configured to display a driver image, and detection results of fatigue state and distraction state of a driver; and a driver state detection apparatus, configured to perform head pose detection and eye state detection on a driver image to obtain head pose information and eye state information; and determine detection results of fatigue state and distraction state of the driver according to the head pose information and the eye state information.

The driver state detection apparatus includes the driving state detection apparatus according to any one of the foregoing embodiments of the present disclosure.

Based on the driver monitoring system provided in the foregoing embodiments of the present disclosure, head pose detection and eye state detection may be performed on a driver image, and detection results of fatigue state and distraction state of a driver are determined according to detected head pose information and eye state information. In the embodiments of the present disclosure, by performing head pose detection and eye state detection on a driver image, a joint and real-time detection of the fatigue state and distraction state of a driver is implemented, so that corresponding measures are taken in time when the driver's driving state is poor, thereby improving the driving safety and reducing the occurrence of road traffic accidents.

In addition, the embodiments of the present disclosure provide another electronic device, including: a memory, configured to store a computer program; and a processor configured to execute the computer program stored in the memory, where when the computer program is executed, the driving state detection method according to any of the foregoing embodiments of the present disclosure is implemented.

Figure 7:
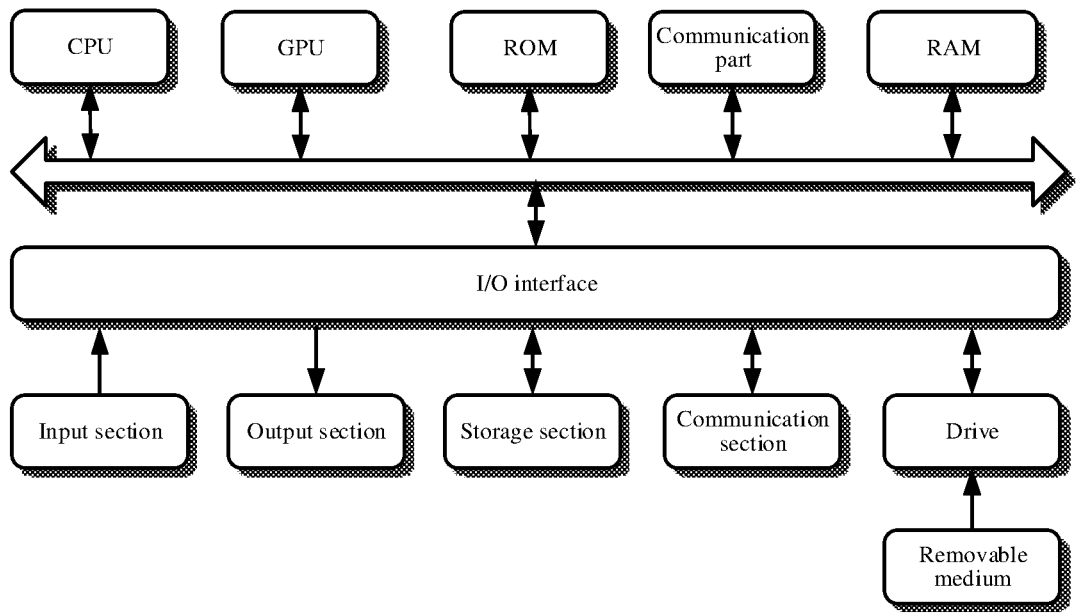
FIG. 7 is a schematic structural diagram of one application embodiment of an electronic device according to the present disclosure.

FIG. 7 is a schematic structural diagram of one application embodiment of an electronic device according to the present disclosure. Referring to FIG. 7 below, a schematic structural diagram of an electronic device, which may be a terminal device or a server, suitable for implementing the embodiments of the present disclosure is shown. As shown in FIG. 7, the electronic device includes one or more processors, a communication part, and the like. The one or more processors are, for example, one or more CPUs, and/or one or more GPUs, and the like. The processor may perform various appropriate actions and processing according to executable instructions stored in an ROM or executable instructions loaded from a storage section to an RAM. The communication part may include, but is not limited to, a network card, which may include, but is not limited to, an Infiniband (IB) network card, and the processor may communicate with the ROM and/or the RAM to execute executable instructions, is connected to the communication part through the bus, and communicates with other target devices via the communication part, thereby completing operations corresponding to any driving state detection method provided by the embodiments of the present disclosure, for example, performing head pose detection and eye state detection on a driver image to obtain head pose information and eye state information; and determining detection results of fatigue state and distraction state of a driver according to the head pose information and the eye state information.

In addition, the RAM may further store various programs and data required for operations of an apparatus. The CPU, the ROM, and the RAM are connected to each other via the bus. In the presence of the RAM, the ROM is an optional module. The RAM stores executable instructions, or writes the executable instructions into the ROM during running, where the executable instructions cause the processor to perform corresponding operations of any method of this disclosure. An Input/Output (I/O) interface is also connected to the bus. The communication part may be integrated, or may be configured to have a plurality of sub-modules (for example, a plurality of IB network cards) connected to the bus.

The following components are connected to the I/O interface: an input section including a keyboard, a mouse and the like; an output section including a Cathode-Ray Tube (CRT), a Liquid Crystal Display (LCD), a speaker and the like; the storage section including a hard disk and the like; and a communication section of a network interface card including an LAN card, a modem and the like. The communication section performs communication processing via a network such as the Internet. A drive is also connected to the I/O interface according to requirements. A removable medium such as a magnetic disk, an optical disk, a magneto-optical disk, a semiconductor memory or the like is mounted on the drive according to requirements, so that a computer program read from the removable medium may be installed on the storage section according to requirements.

It should be noted that the architecture shown in FIG. 7 is merely an optional implementation. During specific practice, the number and types of the components in FIG. 7 may be selected, decreased, increased, or replaced according to actual requirements. Different functional components are separated or integrated or the like. For example, the GPU and the CPU are separated, or the GPU is integrated on the CPU, and the communication part is separated from or integrated on the CPU or the GPU or the like. These alternative implementations all fall within the scope of protection of the present disclosure.

Particularly, a process described above with reference to a flowchart according to the embodiments of the present disclosure may be implemented as a computer software program. For example, the embodiments of the present disclosure include a computer program product, which includes a computer program tangibly included in a machine-readable medium. The computer program includes a program code for performing a method shown in the flowchart. The program code may include instructions for executing the steps of the driving state detection method provided by any of the embodiments of the present disclosure. In such an embodiment, the computer program may be downloaded and installed from the network through the communication section, and/or installed from the removable medium. When the computer program is executed by the CPU, the functions defined in the method according to the present disclosure are executed.

In addition, the embodiments of the present disclosure also provide a computer program, including computer instructions, where when the computer instructions are run in a processor of a device, the driving state detection method according to any of the foregoing embodiments of the present disclosure is implemented.

In addition, the embodiments of the present disclosure also provide a computer-readable storage medium, having a computer program stored thereon, where when the computer program is executed by a processor, the driving state detection method according to any of the foregoing embodiments of the present disclosure is implemented.

Figure 8:
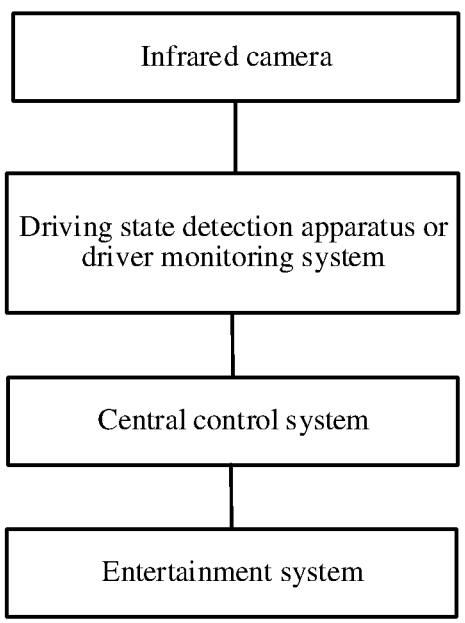
FIG. 8 is a schematic structural diagram of one embodiment of a vehicle according to the present disclosure.

FIG. 8 is a schematic structural diagram of one embodiment of a vehicle according to the present disclosure. As shown in FIG. 8, the vehicle of this embodiment includes a central control system, and further includes the driving state detection apparatus or the driver monitoring system according to any of the foregoing embodiments of the present disclosure.

The vehicle provided based on the foregoing embodiments of the present disclosure includes the driving state detection apparatus or the driver monitoring system according to any of the foregoing embodiments of the present disclosure, head pose detection and eye state detection may be performed on a driver image, and detection results of fatigue state and distraction state of a driver are determined according to detected head pose information and eye state information. In the embodiments of the present disclosure, by performing head pose detection and eye state detection on a driver image, a joint and real-time detection of the fatigue state and distraction state of a driver is implemented, so that corresponding measures are taken in time when the driver's driving state is poor, thereby improving the driving safety and reducing the occurrence of road traffic accidents.

In some implementations, the central control system is configured to: invoke, according to detection results of driver states output by the driving state detection apparatus or the driver monitoring system, an entertainment system (such as a speaker, a buzzer, and a lighting device) in the vehicle or an external entertainment system (such as a speaker, a buzzer, and a lighting device) of the vehicle to output prompt/warning information corresponding to a preset alarm condition when the state detection result of the driver satisfies the alarm condition; and/or, when the state detection result of the driver satisfies a predetermined driving mode switching condition, switch the driving mode to an automatic driving mode, and perform automatic driving control on the vehicle in the automatic driving mode.

In some other embodiments, the central control system is further configured to switch the driving mode to a manual driving mode when a driving instruction for switching to manual driving is received.

Referring again to FIG. 8, the vehicle of the foregoing embodiments may further include: an entertainment system, configured to output prompt/warning information corresponding to the alarm condition according to a control instruction of the central control system; and/or adjust an early-warning effect of prompt/warning information or a playback effect of entertainment according to a control instruction of the central control system.

The entertainment system, for example, may include a speaker, a buzzer, a lighting device, and the like.

Referring again to FIG. 8, the vehicle of the foregoing embodiments may further include: at least one infrared camera, configured to perform image acquisition.

In some of the embodiments, the infrared camera in the vehicle is deployed in at least one location in the vehicle, for example, is deployed in any one or more of the following locations: a location above or near a dashboard, a location above or near a center console, an A-pillar or nearby location, a rearview mirror or nearby location, and the like.

The embodiments in the description are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The method, apparatus, and device in the present disclosure are implemented in many manners. For example, the method, apparatus, and device in the present disclosure may be implemented with software, hardware, firmware, or any combination of software, hardware, and firmware. The foregoing sequence of steps of the method is merely for description, and unless otherwise stated particularly, is not intended to limit the steps of the method in the present disclosure. In addition, in some embodiments, the present disclosure may also be implemented as a program recorded in a recording medium. The program includes machine-readable instructions for implementing the method according to the present disclosure. Therefore, the present disclosure further covers the recording medium storing the program for executing the method according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A driving state detection method, comprising:
performing head pose detection and eye state detection on a driver image to obtain head pose information and eye state information;
determining whether a deviation angle of a head location of a driver exceeds a preset range according to head location information of the driver in the driver image determined based on the head pose information;
in response to determining that the deviation angle of the head location of the driver exceeds the preset range, determining a detection result of distraction state of the driver according to the head pose information and the eye state information; and
in response to determining that the deviation angle of the head location of the driver does not exceed the preset range, determining a detection result of fatigue state and a detection result of distraction state of the driver according to the head pose information and the eye state information.

2. The method according to claim 1, wherein determining the detection result of fatigue state and the detection result of distraction state of the driver according to the head pose information and the eye state information comprises:
   determining a parameter value of an index for representing the fatigue state of the driver and a parameter value of an index for representing the distraction state of the driver according to the head pose information and the eye state information;
   determining the detection result of fatigue state of the driver according to the parameter value of the index for representing the fatigue state of the driver; and
   determining the detection result of distraction state of the driver according to the parameter value of the index for representing the distraction state of the driver.

3. The method according to claim 2, wherein determining the parameter value of the index for representing the fatigue state of the driver and the parameter value of the index for representing the distraction state of the driver according to the head pose information and the eye state information comprises at least one of:
   determining the head location of the driver in the driver image according to the head pose information to obtain the head location information, and obtaining a parameter value of a head location deviation degree according to the head location information within a first period of time;
   determining face orientation of the driver in the driver image according to the head pose information to obtain face orientation information, and obtaining a parameter value of a face orientation deviation degree according to the face orientation information within a second period of time;
   determining a gaze direction of the driver in the driver image according to the head pose information to obtain gaze direction information, and obtaining a parameter value of a gaze direction deviation degree according to the gaze direction information within a third period of time;
   determining an eye region image in the driver image according to the face key points, obtaining gaze direction information of the driver in the eye region image based on a sixth neural network, and obtaining a parameter value of the gaze direction deviation degree according to the gaze direction information within the third period of time;
   obtaining a parameter value of a daze degree according to the eye state information within a fourth period of time;
   determining the head location of the driver in the driver image according to the head pose information to obtain the head location information, and obtaining a parameter value of a nap degree according to the head location information within a fifth period of time;
   obtaining a parameter value of an eye closure degree according to the eye state information within a sixth period of time;
   obtaining a parameter value of a blink degree according to the eye state information within a seventh period of time; or
   obtaining a parameter value of a yawning degree according to mouth state information within an eighth period of time;

wherein the index for representing the fatigue state of the driver comprises one or more of the following: the nap degree, the eye closure degree, the blink degree, or the yawning degree; and
wherein the index for representing the distraction state of the driver comprises one or more of the following: the head location deviation degree, the face orientation deviation degree, the gaze direction deviation degree, or the daze degree.

4. The method according to claim 3,
wherein determining the gaze direction of the driver in the driver image according to the head pose information to obtain the gaze direction information comprises:
   determining a pupil edge location according to an eye image positioned by an eye key point in the face key points, and computing a pupil center location according to the pupil edge location;
   obtaining eyeball rotation angle information in a head pose corresponding to the head pose information according to the pupil center location and an eye center location; and
   determining the gaze direction of the driver according to the head pose information and the eyeball rotation angle information to obtain the gaze direction information; and
wherein determining the pupil edge location according to the eye image positioned by the eye key point in the face key points comprises:
   performing, based on a seventh neural network, pupil edge location detection on the eye region image divided from the image according to the face key points; and
   obtaining the pupil edge location according to information output by the seventh neural network.

5. The method according to claim 3, further comprising:
presetting a reference gaze direction; or,
taking an average gaze direction determined based on first N driver image frames in a video comprising the driver image as the reference gaze direction, wherein N is an integer greater than 1;
wherein obtaining the parameter value of the gaze direction deviation degree according to the gaze direction information within the third period of time comprises:
   obtaining the parameter value of the gaze direction deviation degree according to a deviation angle of the gaze direction information within the third period of time with respect to the reference gaze direction.

6. The method according to claim 3, wherein obtaining the parameter value of the daze degree according to the eye state information within the fourth period of time comprises:
   determining that the driver is in a daze state when eyes of the driver are in an eye open state for a preset period of daze time according to the eye state information; and
   obtaining the parameter value of the daze degree according to the eye state information within the fourth period of time, wherein the fourth period of time comprises the preset period of daze time.

7. The method according to claim 3, wherein obtaining the parameter value of the nap degree according to the head location information within the fifth period of time comprises:
   determining that the driver is in a nap state when the head location of the driver has a deviation degree with respect to a preset reference head location reaching a preset deviation range within a first preset period of time and returns to the preset reference head location within a second preset period of time according to the head location information; and obtaining the parameter value of the nap degree according to the head location information within the fifth period of time, wherein the fifth period of time comprises the first preset period of time and the second preset period of time.

8. The method according to claim 3, wherein obtaining the parameter value of the yawning degree according to the mouth state information within the eighth period of time comprises:

determining that the driver completes a yawn action when a time duration that a mouth of the driver changes from a mouth closed state to a mouth open state and then returns to the mouth closed state is within a preset time range according to the mouth state information; and obtaining the parameter value of the yawning degree according to the mouth state information within the eighth period of time, wherein the eighth period of time comprises the time duration.

9. The method according to claim 2, wherein determining the detection result of distraction state of the driver according to the parameter value of the index for representing the distraction state of the driver comprises:

determining that the detection result of distraction state of the driver is a distraction state when one or more of the parameter values of the indexes for representing the distraction state of the driver satisfy a predetermined distraction condition; wherein the predetermined distraction condition comprises multiple distraction level conditions;

wherein determining that the detection result of distraction state of the driver is the distraction state when one or more of the parameter values of the indexes for representing the distraction state of the driver satisfy the predetermined distraction condition comprises:

determining a distraction state level according to a distraction level condition satisfied by the parameter value of the index for representing the distraction state of the driver; and taking the determined distraction state level as the detection result of distraction state of the driver;

wherein determining the detection result of fatigue state of the driver according to the parameter value of the index for representing the fatigue state of the driver comprises: determining that the detection result of fatigue state of the driver is a fatigue state when one or more of the parameter values of the indexes for representing the fatigue state of the driver satisfy a predetermined fatigue condition; wherein the predetermined fatigue condition comprises multiple fatigue level conditions; and wherein determining that the detection result of fatigue state of the driver is the fatigue state when one or more of the parameter values of the indexes for representing the fatigue state of the driver satisfy the predetermined fatigue condition comprises:

determining a fatigue state level according to a fatigue level condition satisfied by the parameter value of the index for representing the fatigue state of the driver; and taking the determined fatigue state level as the detection result of fatigue state of the driver.

10. The method according to claim 1, further comprising:

performing predetermined distraction action detection on the driver image to determine whether a predetermined distraction action occurs;

in response to determining that the predetermined distraction action occurs, obtaining a parameter value of an index for representing a distraction degree of the driver according to a determination result of whether the predetermined distraction action occurs within a ninth period of time; and determining a detection result of the predetermined distraction action of the driver according to the parameter value of the index for representing the distraction degree of the driver;

wherein the predetermined distraction action comprises one or more of the following: a smoking action, a drinking action, an eating action, a calling action, an entertainment action, or a makeup action.

11. The method according to claim 10, wherein performing predetermined distraction action detection on the driver image to determine whether the predetermined distraction action occurs comprises:

extracting a feature of the driver image;

extracting multiple candidate boxes that comprise the predetermined distraction action based on the feature;

determining an action target box based on the multiple candidate boxes, wherein the action target box comprises a local region of a face and an action interaction object; and performing classification detection of the predetermined distraction action based on the action target box to determine whether the predetermined distraction action occurs.

12. The method according to claim 11, wherein the local region of the face comprises one or more of the following: a mouth region, an ear region, or an eye region;

wherein the action interaction object comprises one or more of the following: a container, a cigarette, a mobile phone, food, a tool, a beverage bottle, eyeglasses, or a mask; and wherein the action target box further comprises a hand bounding box.

13. The method according to claim 11, wherein performing predetermined distraction action detection on the driver image to determine whether the predetermined distraction action occurs comprises:

performing, by an eighth neural network, face detection on the driver image to obtain a face bounding box;

extracting feature information of the face bounding box; and determining, by the eighth neural network, whether a smoking action occurs according to the feature information of the face bounding box.

14. The method according to claim 11, wherein performing predetermined distraction action detection on the driver image to determine whether the predetermined distraction action occurs comprises:

performing, by a ninth neural network, preset target object detection corresponding to an eating action, a drinking action, a calling action, an entertainment action, or a makeup action on the driver image to obtain a bounding box of a preset target object, wherein the preset target object comprises hands, a mouth, eyes, and the action interaction object, and the action interaction object comprises one or more types of the following: a container, food, an electronic device, or cosmetics; and determining whether the predetermined distraction action occurs according to the bounding box of the preset target object, wherein the determination result of whether the predetermined distraction action occurs comprises one of the following: no eating action, no drinking action, no calling action, no entertainment action, and no makeup action occurs; an eating action occurs; a drinking action occurs; a calling action occurs; an entertainment action occurs; or a makeup action occurs.

15. The method according to claim 11,
wherein the action target box further comprises a hand bounding box; and
wherein determining whether the predetermined distraction action occurs according to the bounding box of the preset target object comprises:
  determining whether the predetermined distraction action occurs according to whether a hand bounding box, a mouth bounding box, an eye bounding box, and an action interaction object bounding box are detected, whether the hand bounding box overlaps the action interaction object bounding box, the type of the action interaction object, and whether the distance between the action interaction object bounding box and the mouth bounding box or the eye bounding box satisfies a preset condition.

16. The method according to claim 15, wherein determining whether the predetermined distraction action occurs according to whether the hand bounding box overlaps the action interaction object bounding box, the type of the action interaction object, and whether the distance between the action interaction object bounding box and the mouth bounding box or the eye bounding box satisfies the preset condition comprises at least one of:
  in response to determining that the hand bounding box overlaps the action interaction object bounding box, the type of the action interaction object is a container or food, and the action interaction object bounding box overlaps the mouth bounding box, determining that an eating action, a drinking action or a makeup action occurs; or
  in response to determining that the hand bounding box overlaps the action interaction object bounding box, the type of the action interaction object is an electronic device, and the minimum distance between the action interaction object bounding box and the mouth bounding box is less than a first preset distance, or the minimum distance between the action interaction object bounding box and the eye bounding box is less than a second preset distance, determining that an entertainment action or a calling action occurs.

17. The method according to claim 15, further comprising at least one of:
  in response to determining that the hand bounding box, the mouth bounding box, and any action interaction object bounding box are not detected simultaneously, and the hand bounding box, the eye bounding box, and any action interaction object bounding box are not detected simultaneously, determining that the determination result of whether the predetermined distraction action occurs is that none of an eating action, a drinking action, a calling action, an entertainment action, and a makeup action is detected;
  in response to determining that the hand bounding box does not overlap the action interaction object bounding box, determining that the determination result of whether the predetermined distraction action occurs is that none of an eating action, a drinking action, a calling action, an entertainment action, and a makeup action is detected;
  in response to determining that the type of the action interaction object is a container or food, and the action interaction object bounding box does not overlap the mouth bounding box, determining that the determination result of whether the predetermined distraction action occurs is that none of an eating action, a drinking action, a calling action, an entertainment action, and a makeup action is detected; or
  in response to determining that the type of the action interaction object is an electronic device, and the minimum distance between the action interaction object bounding box and the mouth bounding box is not less than the first preset distance, or the minimum distance between the action interaction object bounding box and the eye bounding box is not less than the second preset distance, determining that the determination result of whether the predetermined distraction action occurs is that none of an eating action, a drinking action, a calling action, an entertainment action, and a makeup action is detected.

18. The method according to claim 1, further comprising:
performing alarm or intelligent driving control according to a state detection result of the driver, wherein the state detection result of the driver comprises one or more of the following: the detection result of fatigue state, the detection result of distraction state, or a detection result of predetermined distraction action;
wherein performing alarm or intelligent driving control according to the state detection result of the driver comprises at least one of:
  outputting prompt/warning information corresponding to a preset alarm condition when the state detection result of the driver satisfies the preset alarm condition; and
  switching a driving mode to an automatic driving mode when the state detection result of the driver satisfies a predetermined driving mode switching condition.

19. An electronic device, comprising:
a memory, configured to store a computer program; and
a processor, configured to execute the computer program stored in the memory, wherein when the computer program is executed, the processor is caused to execute:
performing head pose detection and eye state detection on a driver image to obtain head pose information and eye state information;
determining whether a deviation angle of a head location of a driver exceeds a preset range according to head location information of the driver in the driver image determined based on the head pose information;
in response to determining that the deviation angle of the head location of the driver exceeds the preset range, determining a detection result of distraction state of the driver according to the head pose information and the eye state information; and
in response to determining that the deviation angle of the head location of the driver does not exceed the preset range, determining a detection result of fatigue state and a detection result of distraction state of the driver according to the head pose information and the eye state information.

20. A non-transitory computer-readable storage medium, having a computer program stored thereon, wherein when the computer program is executed by a processor, the processor is caused to execute:
- performing head pose detection and eye state detection on a driver image to obtain head pose information and eye state information;
- determining whether a deviation angle of a head location of a driver exceeds a preset range according to head location information of the driver in the driver image determined based on the head pose information;
- in response to determining that the deviation angle of the head location of the driver exceeds the preset range, determining a detection result of distraction state of the driver according to the head pose information and the eye state information; and
- in response to determining that the deviation angle of the head location of the driver does not exceed the preset range, determining a detection result of fatigue state and a detection result of distraction state of the driver according to the head pose information and the eye state information.

* * * * *